US012699270B2

(12) United States Patent     (10) Patent No.:   US 12,699,270 B2

Melli et al.        (45) Date of Patent:     Aug. 4, 2026

(54) INPUT/OUTPUT COUPLING GRATING AND DISPLAY INCLUDING THE SAME

(71) Applicant: Magic Leap, Inc., Plantation, FL (US)

(72) Inventors: Mauro Melli, San Leandro, CA (US); Robert D. Tekolste, Fort Lauderdale, FL (US); Vikramjit Singh, Pflugerville, TX (US); Shuqiang Yang, Austin, TX (US); Frank Y. Xu, Austin, TX (US); Qizhen Xue, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/865,616

(22) PCT Filed: May 15, 2023

(86) PCT No.: PCT/US2023/022285

§ 371 (c)(1),
(2) Date: Nov. 13, 2024

(87) PCT Pub. No.: WO2023/220480

PCT Pub. Date: Nov. 16, 2023

(65) Prior Publication Data

US 2025/0306376 A1     Oct. 2, 2025

Related U.S. Application Data

(60) Provisional application No. 63/348,694, filed on Jun. 3, 2022, provisional application No. 63/342,004, filed on May 13, 2022.

(51) Int. Cl.
*G02B 5/18*       (2006.01)
*G02B 27/01*     (2006.01)

(52) U.S. Cl.
CPC ....... *G02B 27/0172* (2013.01); *G02B 5/1809* (2013.01); *G02B 5/1823* (2013.01); *G02B 5/1857* (2013.01); *G02B 2207/101* (2013.01)

(58) Field of Classification Search
CPC ......................... G02B 27/0172; G02B 5/1809; G02B 5/1823; G02B 5/1857; G02B 2207/101
See application file for complete search history.

(56) References Cited

U.S. PATENT DOCUMENTS

| 10,877,437 B2 | 12/2020 | Gelman et al. |
| 11,226,446 B2 | 1/2022 | Mohanty |

(Continued)

FOREIGN PATENT DOCUMENTS

| JP | 2004286956 A | * | 10/2004 | ............... G02B 5/18 |
| WO | 2021050924 A1 | | 3/2021 | |
| WO | 2023003854 A1 | | 1/2023 | |

OTHER PUBLICATIONS

International Search Report and Written Opinion in International Appln. No. PCT/US2023/022285, mailed on Sep. 27, 2023, 15 pages.

(Continued)

*Primary Examiner* — Towfiq Elahi
(74) *Attorney, Agent, or Firm* — Fish & Richardson P.C.

(57) ABSTRACT

A head-mounted display system includes a waveguide configured to guide light from a light projection system coupled into the waveguide; a grating structure optically coupled to the waveguide, the grating structure being configured to couple light from the light projection system into the waveguide. The grating structure includes a grating layer having a grating with multiple ridges having ablaze profile in at least one cross-section, the blaze profile having an anti-blaze angle of 85° or less; and one or more additional layers on the grating layer, the additional layers including a first layer of a material having a refractive index of 1.5 or less at an operative wavelength of the head-mounted display, the first layer being an outermost layer of the grating structure.

23 Claims, 30 Drawing Sheets

(56)        References Cited

U.S. PATENT DOCUMENTS

| | | | |
|---|---|---|---|
| 2002/0122015 A1* | 9/2002 | Song | G02B 27/0172 |
| | | | 345/8 |
| 2020/0142202 A1* | 5/2020 | Lee | G02B 6/0035 |
| 2021/0033867 A1 | 2/2021 | Luo et al. | |
| 2021/0055555 A1* | 2/2021 | Chi | G02B 27/44 |
| 2021/0072437 A1* | 3/2021 | Singh | G02B 27/0172 |
| 2021/0157148 A1 | 5/2021 | Lou et al. | |
| 2022/0128817 A1 | 4/2022 | Singh et al. | |
| 2024/0151971 A1* | 5/2024 | Vora | G02B 5/1866 |

OTHER PUBLICATIONS

Mattelin et al., "Design and fabrication of blazed gratings for a waveguide-type head mounted display," Optics Express, 2020, 28(8):11175-11190.
Extended European Search Report in European Appln. No. 23804395. 4, mailed on Jul. 17, 2025, 9 pages.

\* cited by examiner

Diffraction Efficiency in launch direction

Efficiency:52.46%

Reflection
Efficiency: 0.93%

Diffraction Efficiency in launch direction

Efficiency:40.62%

Reflection
Efficiency: 4.13%

Actual Fabricated Sample

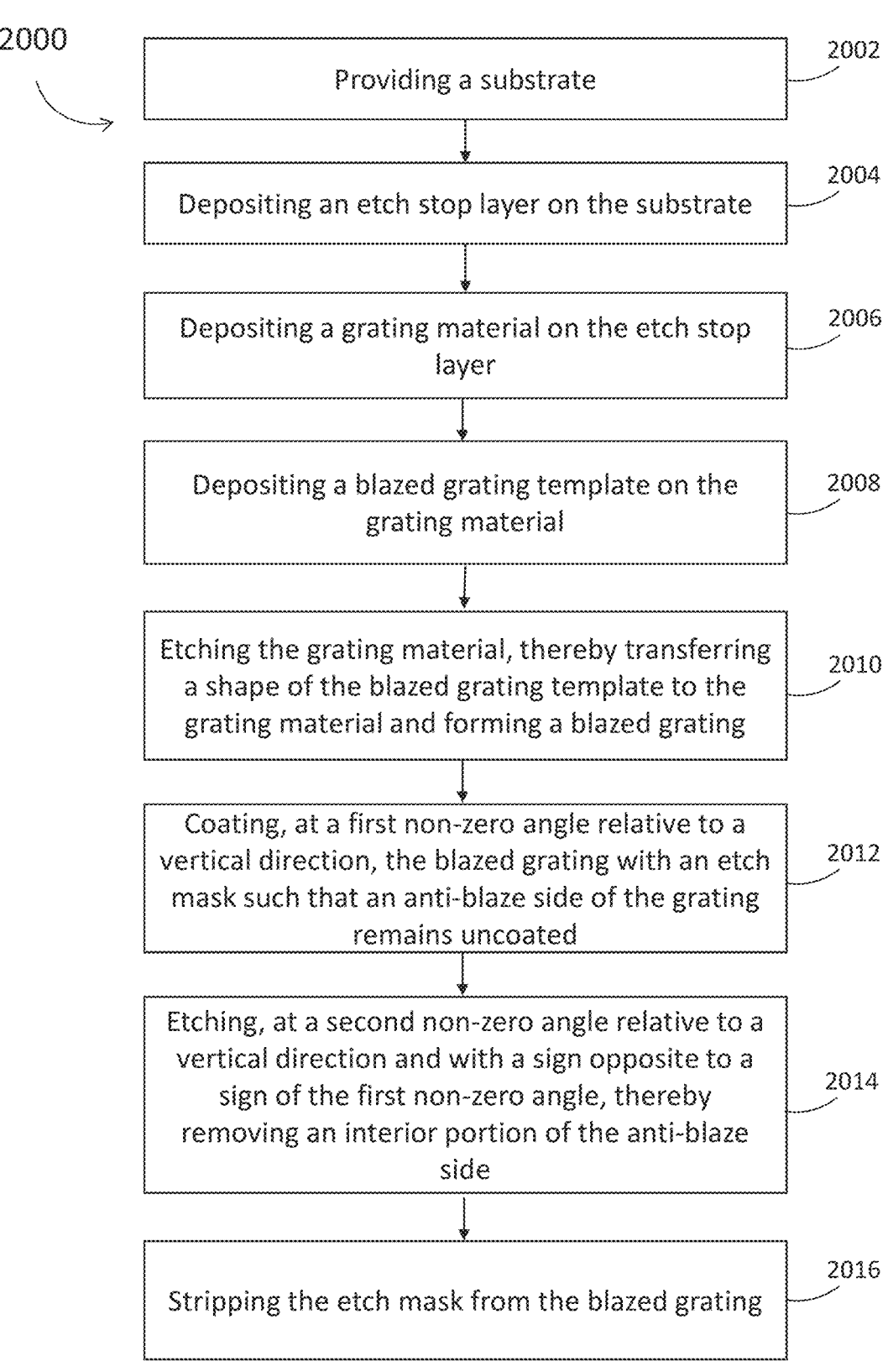

2000

| 2002 |
| Providing a substrate |

| 2004 |
| Depositing an etch stop layer on the substrate |

| 2006 |
| Depositing a grating material on the etch stop layer |

| 2008 |
| Depositing a blazed grating template on the grating material |

| 2010 |
| Etching the grating material, thereby transferring a shape of the blazed grating template to the grating material and forming a blazed grating |

| 2012 |
| Coating, at a first non-zero angle relative to a vertical direction, the blazed grating with an etch mask such that an anti-blaze side of the grating remains uncoated |

| 2014 |
| Etching, at a second non-zero angle relative to a vertical direction and with a sign opposite to a sign of the first non-zero angle, thereby removing an interior portion of the anti-blaze side |

| 2016 |
| Stripping the etch mask from the blazed grating |

FIG. 20

INPUT/OUTPUT COUPLING GRATING AND DISPLAY INCLUDING THE SAME

CROSS-REFERENCE TO RELATED APPLICATIONS

This application is a National Stage Application under 35 U.S.C. § 371 and claims the benefit of International Application No. PCT/US2023/022285, filed May 15, 2023, which claims the benefit of priority to U.S. Application No. 63/342, 004 filed on May 13, 2022, and U.S. Application No. 63/348,694, filed on Jun. 3, 2022, the contents of which are hereby incorporated by reference.

BACKGROUND

The present disclosure relates to display systems and, more particularly, to augmented and virtual reality display systems and input coupling gratings (ICGs) or output coupling gratings for use therewith.

DESCRIPTION OF THE RELATED ART

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by, which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

Grating structures suitable for input coupling gratings (ICGs) for coupling light into a waveguide, orthogonal pupil expanders (OPEs) for expanding the eye box by spacing apart the incoupled light into multiple, parallel light beams, exit pupil expanders (EPE) for redirecting and out-coupling light out of the waveguide, and combined pupil expanders (CPEs) for performing aspects of both the OPEs and EPEs are described that are substantially insensitive to polarization, have low back reflection, and allow operation over a wide range of input angles are disclosed. Such grating structures can be used in inline alignment configurations where the ICG for multiple stacked waveguides are aligned along a common optical path. Such TCGs can be particularly useful for head-mounted displays using a microLED (μLED) light projection system, which can emit unpolarized light over a wide range of angles.

Examples of the grating structures include asymmetric blazed (or "blaze") gratings either formed from a high index material and/or coated with a high index material (such as titanium dioxide, gallium phosphide, silicon carbide and others). Such high index layers can provide grating structures with relatively low optical losses. Due to the high index film, the reflected light can be significant (e.g., >10% for some incident angles), which can cause undesirable results, e.g., unwanted back reflection coupling and ghosting, reduced contrast, etc. in the virtual images. Reducing this back reflection can lead to more light being diffracted and coupled in the right order in TIR in the waveguide, and thus benefits of reduced reflection can outweigh advantages of light recycling that may occur from the reflections.

The grating structures described herein can have low reflection with high diffraction efficiency in both transverse electric (TE) and transverse magnetic (TM) polarization modes. Such optical performance can enable overall eyepiece efficiency per Watt of energy used by the projectors, e.g., μLED projections systems, e.g., that use unpolarized light and ideally operate with reduced back reflection from grating structures into the lens of the projection system. Such grating structures can also work well for single active layer architectures where all colors (e.g., R, G, B) are waveguided in a single high index active layer but use grating structures working in transmission mode to harness use of high diffraction efficiency in orthogonal polarization states, e.g., enabling use of μLED projection systems.

The grating structures described herein can have a high directionality, which can allow for propagation of light in a controlled direction within an eyepiece including the grating structure. For example, a blazed grating can concentrate diffracted light in a particular direction determined by the geometry of the blazed grating more than a non-blazed grating can.

Various aspects of the disclosed subject matter are summarized as follows.

In general, in a first aspect, the disclosure features a head-mounted display system including: a head-mountable frame; a light projection system configured to output light to provide image content; a waveguide supported by the frame, the waveguide configured to guide at least a portion of the light from the light projection system coupled into the waveguide; a grating structure optically coupled to the waveguide, the grating structure being configured to couple light from the light projection system into the waveguide. The grating structure includes a grating layer having a grating with multiple (e.g., parallel) ridges having a blaze profile in at least one cross-section, the blaze profile having an anti-blaze angle of 85° or less; and one or more additional layers on the grating layer, the one or more layers including a first layer of a material having a refractive index of 1.5 or less at an operative wavelength of the head-mounted display, the first layer being an outermost layer of the grating structure.

Examples of the head-mounted display system can include one or more of the following features. For example, the blaze profile can have a blaze angle of 950 or more. The ridges can have a profile shape selected from the group including of: trapezoidal, parallelogram, triangular, and stepped. The anti-blaze angle can be in a range from 1° to 89° (e.g., 5° to 85°, 20° to 60°, 45° to 75°, 50° to 60°, 60° to 70°, 70° to 80°). The ridges can have a height in a range from 10 nm to 1,000 nm (e.g., 50 nm to 500 nm, 100 nm to 400 nm, 200 nm to 400 nm, 250 nm to 350 nm). The grating can have a pitch in a range from 100 nm to 5,000 nm (e.g., 100 nm to 2,500 nm, 100 nm to 1,000 nm, 200 nm to 750 nm, 250 nm to 500 nm, 300 nm to 400 nm). The grating can have a duty cycle in a range from 5% to 95% (e.g., 10% to 75%, 20% to 50%, 30% to 40%). The first layer can have a thickness in a range from 5 nm to 500 nm (e.g., 10 nm to 400 nm, 20 nm to 300 nm, 50 nm to 250 nm, 100 nm to 200 nm, 130 nm to 170 nm).

In some implementations, the one or more additional layers includes a second layer between the first layer and the grating layer, the second layer including a second material having a refractive index greater than 1.5 (e.g., 1.6 or more, 1.7 or more, 1.8 or more, 1.9 or more) at the operative wavelength. The second layer can have a thickness in a range from 5 nm to 500 nm (e.g., 10 nm to 400 nm, 20 nm to 300 nm, 50 nm to 250 nm, 100 nm to 200 nm, 130 nm to 170 nm).

The grating layer can include a grating material having a refractive index of 1.5 or more (e.g., 1.6 or more, 1.7 or more, 1.8 or more, 1.9 or more) at the operative wavelength. The grating material can include a cross-linked polymer (e.g., a thermally or UV cross-linked polymer). The grating material can include nanoparticles (e.g., $TiO_2$ or $ZrO_2$ nanoparticles).

The grating structure can be at least partially transmissive (e.g., highly transmissive or partially reflective) at the operative wavelength.

The grating structure can be configured to couple light into the waveguide at operative wavelengths corresponding to multiple differently colored pixels of the light projection system during operation.

The grating layer and the waveguide can be composed of the same material. The material can include a polymer. The material can have a refractive index of 1.7 or more (e.g., 1.8 or more, 1.9 or more, 2.0 or more, 2.1 or more). The material can be a composite material. The composite material can include nanoparticles.

The light from the light projection system can be unpolarized light.

The light projection system can include a microLED display, an LCoS display, or a laser beam scanner display.

The head-mounted display can include one or more additional waveguides and one or more additional grating structures each associated with a corresponding one of the additional waveguides. The grating structures of each of the waveguides can be arranged in an inline configuration. At least one of the grating structures can be a reflection grating. The reflection grating can be the grating structure of the waveguide furthest from the light projection system (e.g., to recycle the light).

At least some of the ridges can have a single-step geometry. At least some of the ridges can have a multi-step geometry.

In general, in another aspect, the disclosure features an article, including: a waveguide layer composed of a waveguide material having a refractive index of 1.7 or more at an operative wavelength; a grating structure at a surface of the waveguide layer. The grating structure can include: a grating layer having a grating composed of multiple (e.g., parallel) ridges having a blaze profile in at least one cross-section, the blaze profile having an anti-blaze angle of 890 or less, a height in a range from 10 nm to 1,000 nm, and a duty cycle in a range from 5% to 95%; and one or more additional layers disposed on the grating layer, the one or more layers including a first layer of a material having a thickness in a range from 5 nm to 500 nm and a refractive index of 1.5 or less at the operative wavelength, the first layer being an outermost layer of the grating structure.

Implementations of the article can include one or more features of the prior aspect of the disclosure.

In general, in a further aspect, the disclosure features a head-mounted display system including: a head-mountable frame; a light projection system configured to output light to provide image content; a waveguide supported by the frame, the waveguide configured to guide at least a portion of the light from the light projection system coupled into the waveguide; a grating structure optically coupled to the waveguide, the grating structure being configured to couple light guided by the waveguide out of the waveguide. The grating structure includes a grating layer having a grating with multiple (e.g., parallel) ridges having a blaze profile in at least one cross-section, the blaze profile having an anti-blaze angle of 89° or less; and one or more additional layers on the grating layer, the one or more layers including a first layer of a material having a refractive index of 1.5 or less at an operative wavelength of the head-mounted display, the first layer being an outermost layer of the grating structure.

Implementations of the head-mounted display system can include one or more of the following features and/or features of other aspects. For example, the grating structure can be part of an exit pupil expander (EPE) or a combined pupil expander (CPE). The grating structure can be part of an orthogonal pupil expander.

In general, in another aspect, the disclosure features a device, including: a waveguide for guiding light at an operative wavelength; a grating layer supported by the waveguide, the grating layer including a plurality of spaced-apart ridges of a grating material forming a grating having a blaze profile in at least one cross-section, each ridge having a blaze side and an anti-blaze side opposite the blaze side, the anti-blaze side having a concave cross-sectional shape; and one or more additional layers supported by the grating layer, the one or more additional layers including a first layer including a first material different from the grating material, the first material being located on the ridges and between the ridges.

In general, in another aspect, the disclosure features a device including: a waveguide for guiding light at an operative wavelength; a grating layer extending in a plane, the grating layer being supported by the waveguide and including a plurality of spaced-apart ridges of a grating material forming a grating having a blaze profile in at least one cross-section, each ridge having a blaze side and an anti-blaze side opposite the blaze side, wherein the anti-blaze side has a non-linear shape in the cross-section, and an apex of the anti-blaze side is aligned with a base of the anti-blaze side in the cross-section in a direction normal to the plane of the grating layer; and one or more additional layers supported by the grating layer, the one or more additional layers including a first layer including a first material different from the grating material, the first material being located on the ridges and between the ridges.

In general, in another aspect, the disclosure features a device including: a waveguide for guiding light at an operative wavelength; a grating layer supported by the waveguide, the grating layer including a plurality of spaced-apart ridges of a grating material forming a grating having a blaze profile in at least one cross-section, each ridge having a blaze side and an anti-blaze side opposite the blaze side; and one or more additional layers supported by the grating layer, the one or more additional layers including a first layer including a first material different from the grating material, the first material being located on the ridges and between the ridges, wherein for at least some of the ridges, the ridges and the one or more additional layers form an air gap on the anti-blaze side of the ridges.

Implementations of the three devices in these aspects can include one or more of the following features and/or features of other aspects. For example, the concave cross-sectional shape of the anti-blaze side includes a curved portion. The anti-blaze side can include a curved portion.

A radius of curvature of the curved portion can be in a range from 20 nm to 500 nm.

In some examples, the concave cross-sectional shape of the anti-blaze side includes one or more line segments. The anti-blaze side can include one or more line segments. A first line segment can have a positive slope and a second line segment has a negative slope, and the first line segment can be vertically higher than the second line segment. In some examples, at least two line segments of the one or more line segments meet at an obtuse angle. A length of at least one of the line segments can be in a range of 5 nm to 500 nm.

In some examples, an edge of at least one of the one or more additional layers and the anti-blaze side define an air gap.

An index of refraction of the first layer of the one or more additional layers can be at least 1.5 at the operative wavelength.

The one or more additional layers can include a second layer, and an index of refraction of the second layer is at least 1.5 at the operative wavelength.

In some examples, the one or more additional layers do not coat the anti-blaze side of each ridge.

Each ridge can have a blaze angle of 950 or more. Each ridge can have an anti-blaze angle in a range from 1° to 89°. The ridges can have a height in a range from 10 nm to 1,000 nm. The grating can have a pitch in a range from 100 nm to 5,000 nm. The grating can have a duty cycle in a range from 5% to 95%.

The first layer can have a thickness in a range from 5 nm to 500 nm. The second layer can have a thickness in a range from 5 nm to 500 nm.

The grating material can include a cross-linked polymer. The grating material can include nanoparticles.

The grating structure can be at least partially transmissive at the operative wavelength.

The grating layer and the waveguide can be composed of the same material.

In some examples, the material includes a polymer. The material can have a refractive index of 1.7 or more. The material can be a composite material (e.g., including nanoparticles).

The device can include one or more additional waveguides and one or more additional grating structures each associated with a corresponding one of the additional waveguides.

The grating structures of each of the waveguides can be arranged in an inline configuration. At least one of the grating structures can be a reflection grating.

At least some of the ridges can include a blaze side with a single-step geometry. At least some of the ridges can include a blaze side with a multi-step geometry.

In a further aspect, the disclosure features a head mounted display (HMD) configured to be worn on a head of a user, the HMD including: a frame; a pair of optical elements supported by the frame such that each optical element of the pair of optical elements is capable of being disposed forward of an eye of the user; a device in accordance with the prior aspect, wherein the device is disposed on at least one of the optical elements of the pair of optical elements; and a projection system configured to project light into the waveguide of the device for display to the eye of the user.

Each optical element can include a distal and proximal surface, wherein the proximal surface is closer to the eye of the user than the distal surface, and the grating of the device is disposed on the proximal surface.

Each optical element can include a distal and proximal surface, wherein the proximal surface is closer to the eye of the user than the distal surface, and the grating of the device is disposed on the distal surface.

The grating structure can be configured to couple light into the waveguide at operative wavelengths corresponding to multiple differently colored pixels during operation.

The light from the light projection system can be polarized or unpolarized light.

The light projection system can include a microLED display, an LCoS display, or a laser beam scanner display.

The device can include one or more additional grating structures, wherein a furthest grating structure from the light projection system is a reflection grating.

In general, in another aspect, the disclosure features method including: depositing an etch stop layer on a substrate; depositing a grating material on the etch stop layer; depositing a blazed grating template on the grating material; using the blazed grating template, etching the grating material, thereby transferring a shape of the blazed grating template to the grating material and forming a blazed grating; coating, at a first non-zero angle relative to a vertical direction, the blazed grating with an etch mask, such that an anti-blaze side of the grating remains uncoated; etching, at a second non-zero angle relative to a vertical direction and with a sign opposite to a sign of the first non-zero angle, thereby removing an interior portion of the anti-blaze side; and stripping the etch mask from the blazed grating.

Implementations of the head-mounted display system can include one or more of the following features and/or features of other aspects. For example, the substrate is a waveguide.

The shape of the blazed grating template can extend vertically beyond a shape of the blazed grating.

Etching the grating material can conclude before the blazed grating template is completely used.

The method can include, before coating the blazed grating with the etch mask, stripping a remaining portion of the blazed grating template from the grating material.

Etching the grating material can include at least one of dry plasma etching, chemical etching, and wet chemical etching.

The first non-zero angle can be determined by an anti-blaze angle of the blazed grating. An absolute value of the first non-zero angle can be equal to at least a difference between the anti-blaze angle and 90°.

The anti-blaze side can include a concave, curved portion. The anti-blaze side can include at one or more linear segments.

The method can further include: coating the blazed grating with one or additional layers, wherein at least one of the one or more additional layers includes a material with a refractive index of at least 1.5 at an operative wavelength. Coating the blazed grating with the one or additional layers can lead to the formation of an air gap between an edge of at least one of the one or more additional layers and the anti-blaze side.

In general, in another aspect, the disclosure features a head-mounted display (HMD) including: a waveguide for guiding light at an operative wavelength; and a grating structure including: a grating layer supported by the waveguide, the grating layer including a plurality of spaced-apart ridges of a grating material forming a grating having a blaze profile in at least one cross-section, each ridge having a blaze side and an anti-blaze side opposite the blaze side, the anti-blaze side having a concave cross-sectional shape; and one or more additional layers supported by the grating layer, the one or more additional layers including a first layer including a first material different from the grating material, the first material being located on the ridges and between the ridges.

Implementations of the head-mounted display system can include one or more of the following features and/or features of other aspects. For example, a diffraction efficiency of the grating structure for unpolarized light incident over a range of incidence angles from −20° to +20° across wavelength range from 400 nm to 700 nm can be 10% or more (e.g., 20% ore more, 30% or more).

A back-reflection of the grating structure can be 30% or less for unpolarized light incident over a range of incidence angles from −20° to +20° across wavelength range from 400 nm to 700 nm.

The HMD can include a projection system and during operation the grating structure receives unpolarized light or polarized light from a projection system.

The grating structure can be located to receive light from the projection system that, before being in-coupled into the waveguide by the grating structure, travels through the waveguide.

Other features and advantages will be apparent from the drawings, the description below, and the claims.

BRIEF DESCRIPTION OF THE DRAWINGS

FIG. 20 is a flow diagram of a process for forming a blazed grating with a concave anti-blaze side.

Figure 1:
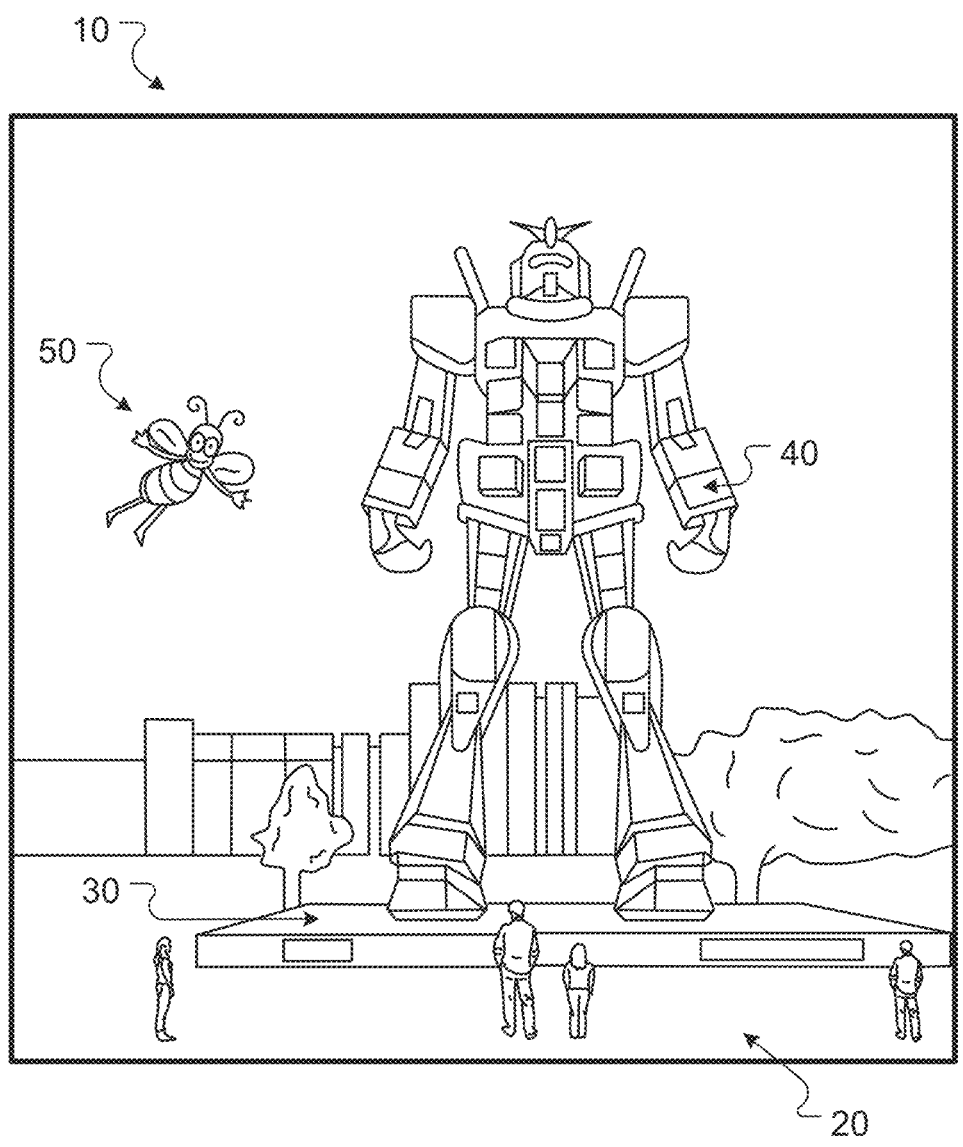
FIG. 1 illustrates a user's view of augmented reality (AR) through an AR device.

Throughout the drawings, reference numbers may be re-used to indicate correspondence between referenced elements. The drawings are provided to illustrate example implementations described herein and are not intended to limit the scope of the disclosure.

DETAILED DESCRIPTION

AR systems may display virtual content to a user, or viewer, while still allowing the user to see the world around them. Preferably, this content is displayed on a head-mounted display, e.g., as part of eyewear, that projects image information to the user's eyes. In addition, the display may also transmit light from the surrounding environment to the user's eyes, to allow a view of that surrounding environment. As used herein, it will be appreciated that a "head-mounted" or "head mountable" display is a display that may be mounted on the head of a viewer or user.

In some AR systems, virtual/augmented/mixed display having a relatively high field of view (FOV) can enhance the viewing experience. The FOV of the display depends on the angle of light output by waveguides of the eyepiece, through which the viewer sees images projected into his or her eye. A waveguide having a relatively high refractive index, e.g., 1.7 or greater, can provide a relatively high FOV. However, to efficiently couple light into the high refractive index waveguide, the diffractive optical coupling elements should also have a correspondingly high refractive index. To achieve this goal, among other advantages, some displays for AR systems according to implementations described herein include a waveguide including a relatively high index (e.g., 1.8 or more, such as 2.0 or more) material, having formed thereon respective diffraction gratings with correspondingly high refractive index, such a Ti-, Ta-, or Li-based oxide. For example, a diffraction grating may be formed directly on a Ti-, Ta-, or Li-based oxide waveguide by patterning a surface portion of the waveguide formed of a Ti-, Ta-, or Li-based oxide.

Some high refractive index diffractive optical coupling elements such as in-coupling or out-coupling optical elements have strong polarization dependence. For example, in-coupling gratings (ICGs) for in-coupling light into a waveguide where the diffractive optical coupling element includes high refractive index material may admit light of a given polarization significantly more than light of another polarization. Such elements may, for example, in-couple light with TM polarization into the waveguide at a rate approximately 3 times that of light with TE polarization. Diffractive optical coupling elements with this kind of polarization dependence may have reduced efficiency (due to the poor efficiency and general rejection of one polarization) and may also create coherent artifacts and reduce the uniformity of a far field image formed by light coupled out of a birefringent waveguide. To obtain diffractive optical coupling elements that are polarization-insensitive or at least that have reduced polarization sensitivity (e.g., that couple light with an efficiency that is relatively independent of polarization), some displays for AR systems according to various implementations described herein include a waveguide with diffraction gratings formed with blazed geometries. The diffraction grating may also be formed directly in the waveguide, which may include high index material (e.g., having an index of refraction of at least 1.9, 2.0, 2.1, 2.2, 2.3, 2.4, 2.5, 2.6, or up to 2.7 or a value in any range between any of these values). A diffractive grating may, for example, be formed in high index materials such as such as Ti-, Ta-, or Li-based oxide like lithium niobate ($LiNbO_3$) or lithium tantalate ($LiTaO_3$) or such as zirconium oxide ($ZrO_2$), titanium dioxide ($TiO_2$) or silicon carbide (SiC), for example, by patterning the high index material with a blazed geometry.

Reference will now be made to the drawings, in which like reference numerals refer to like parts throughout. Unless indicated otherwise, the drawings are schematic not necessarily drawn to scale.

Figure 2:
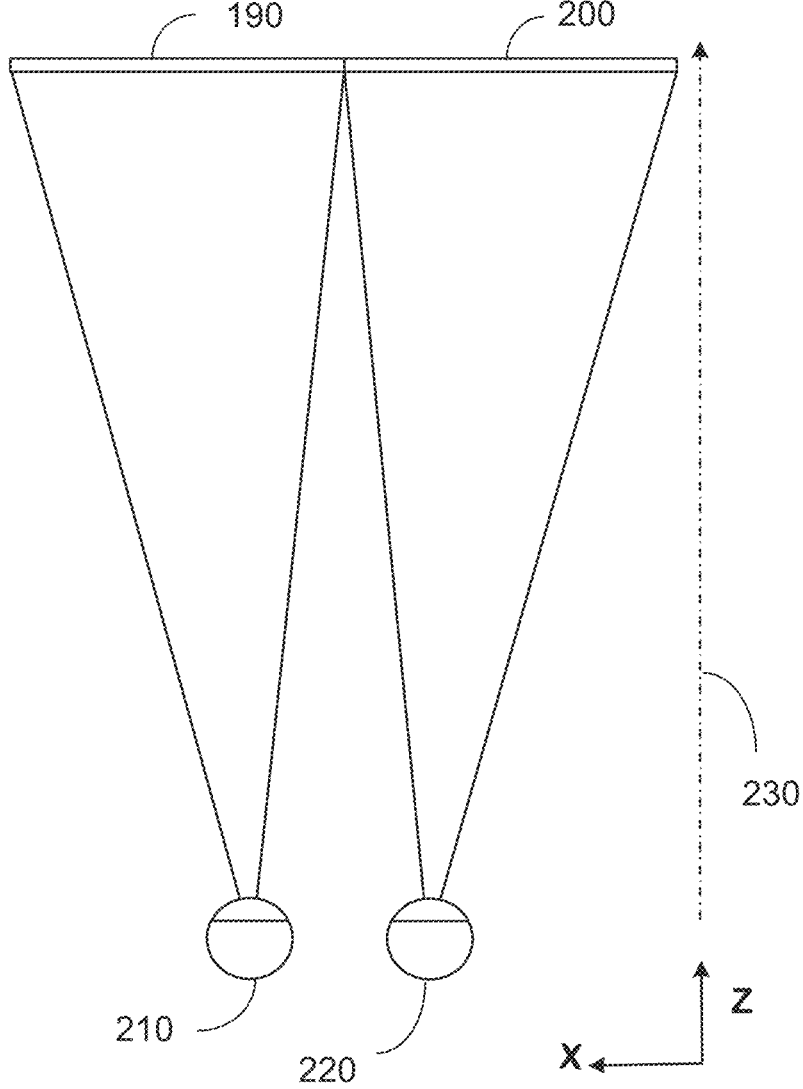
FIG. 2 illustrates a conventional display system for simulating three-dimensional imagery for a user.

FIG. 2 illustrates a conventional display system for simulating three-dimensional imagery for a user. A user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
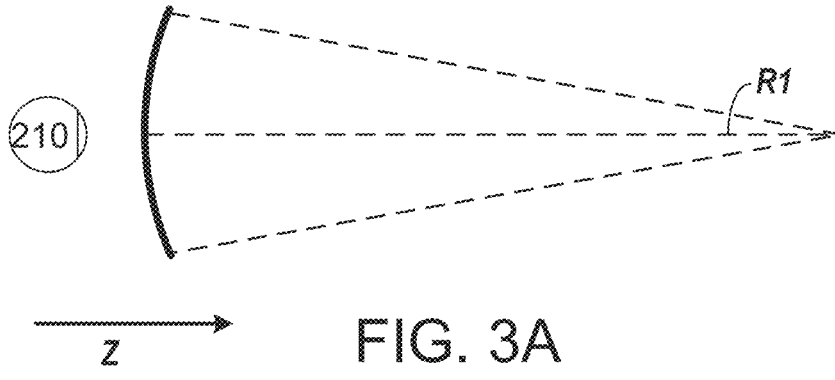
FIGS. 3A-3C illustrate relationships between radius of curvature and focal radius.
Figure 3B:
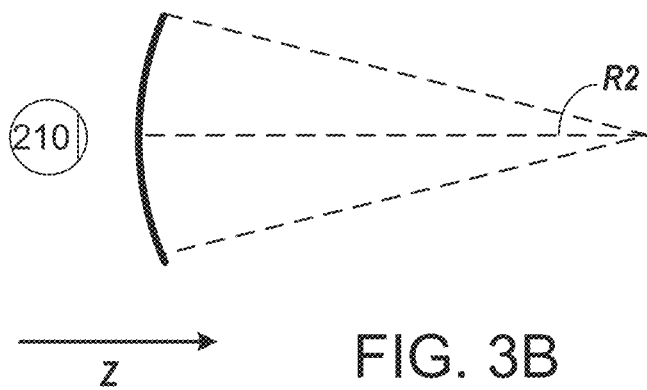
Figure 3C:
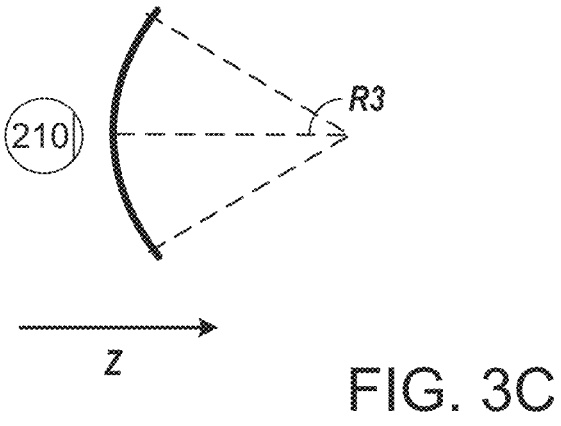

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
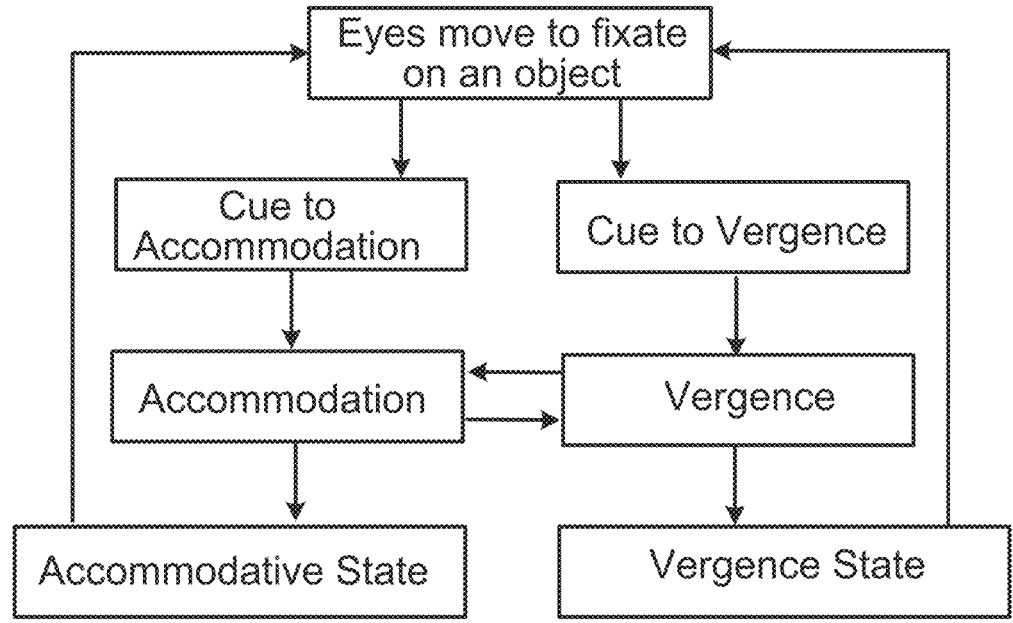
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
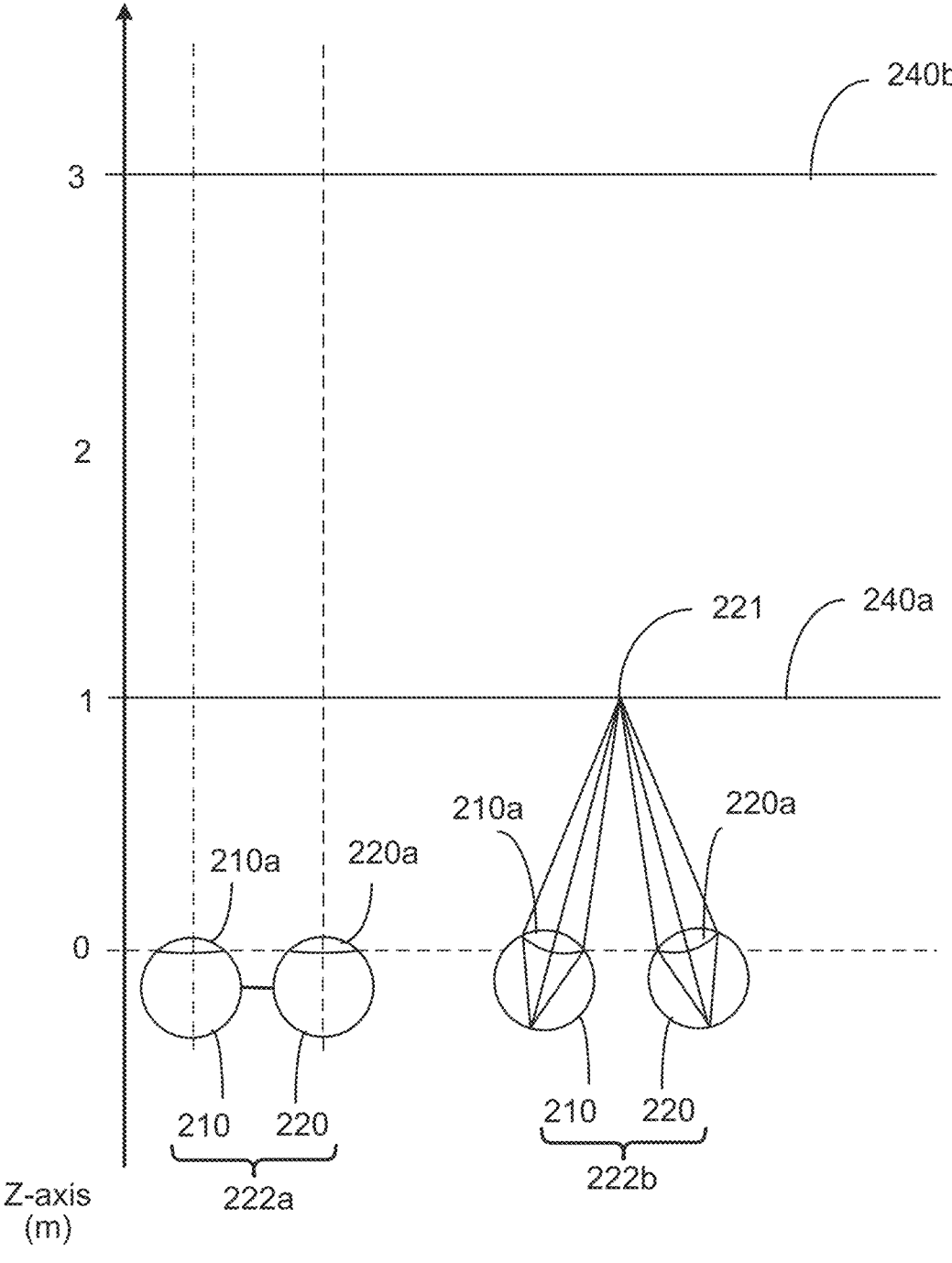
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on a point 221 at less than optical infinity. Notably, the vergence states of each pair of eyes is different, with the pair of eyes 222a directed straight ahead, while the pair of eyes 222 converge on the point 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some implementations, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated implementation, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figures 4C, 4D:
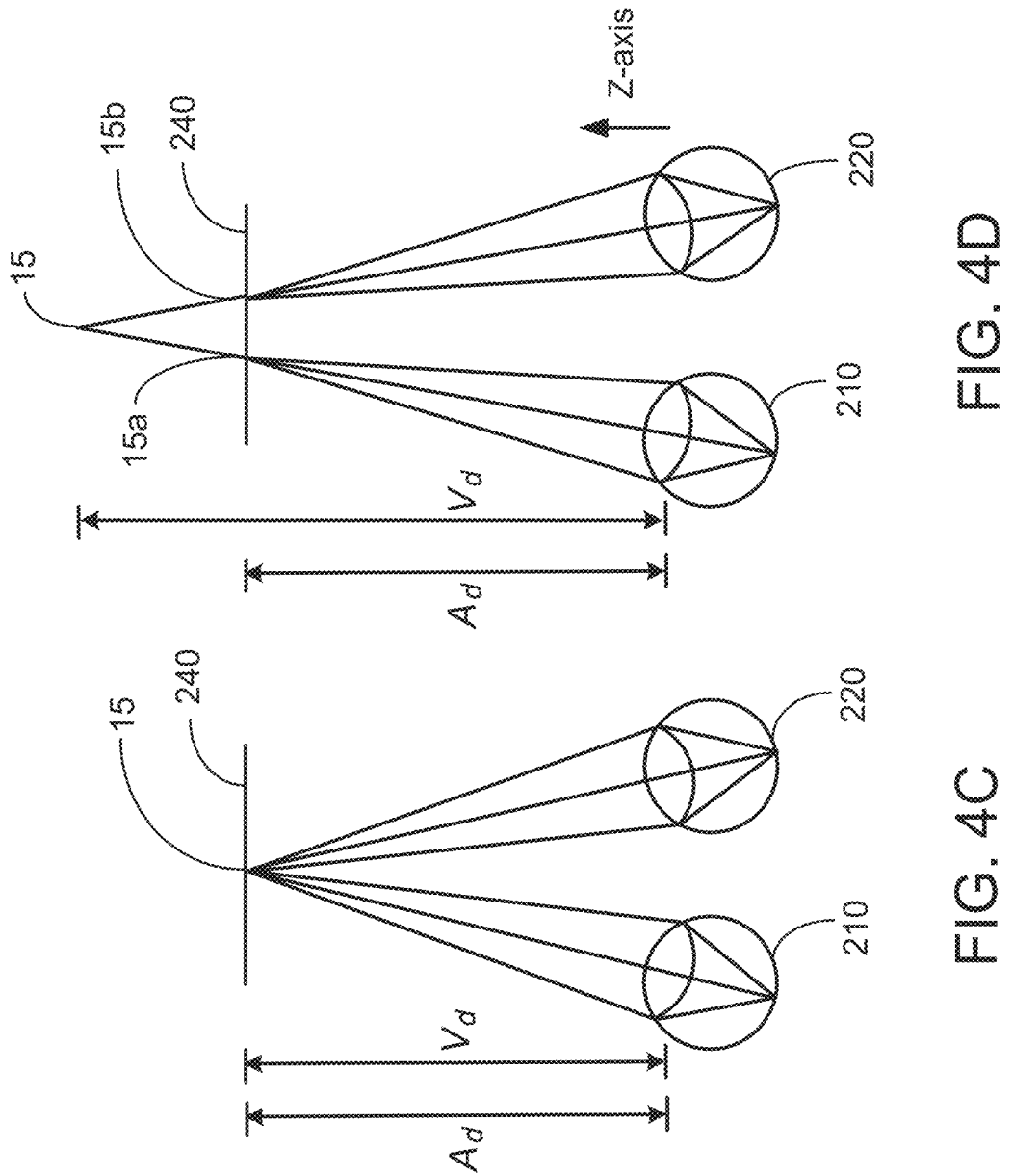
FIG. 4C illustrates an example of a representation of a top-down view of a user viewing content via a display system.
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, Ad. Similarly, there are particular vergence distances, Vd, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some implementations. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., Vd-Ad) and may be characterized using diopters.

In some implementations, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some implementations, display systems disclosed herein (e.g., the display system 250, FIG. 6) present images to the viewer having accommodation-vergence mismatch of about 0.5 diopter or less. In some other implementations, the accommodation-vergence mismatch of the images provided by the display system is about 0.33 diopter or less. In yet other implementations, the accommodation-vergence mismatch of the images provided by the display system is about 0.25 diopter or less, including about 0.1 diopter or less.

Figure 5:
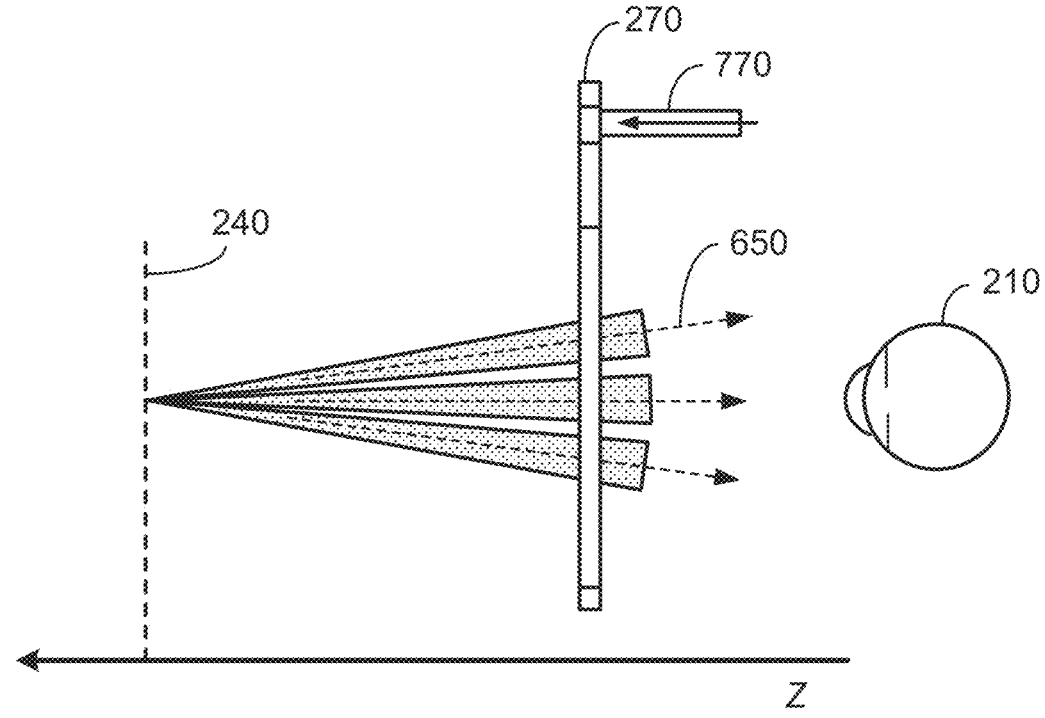
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light rays 770 that is encoded with image information, and to output that light to the user's eye 210. The waveguide 270 may output the exit beam 650 with a defined amount of wavefront divergence corresponding to the wavefront divergence of a light field produced by a point on a desired depth plane 240. In some implementations, the same amount of wavefront divergence is provided for all objects presented on that depth plane. In addition, it will be illustrated that the other eye of the user may be provided with image information from a similar waveguide.

In some cases, a single waveguide may be configured to output light with a set amount of wavefront divergence corresponding to a single or limited number of depth planes and/or the waveguide may be configured to output light of a limited range of wavelengths. Consequently, in some implementations, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
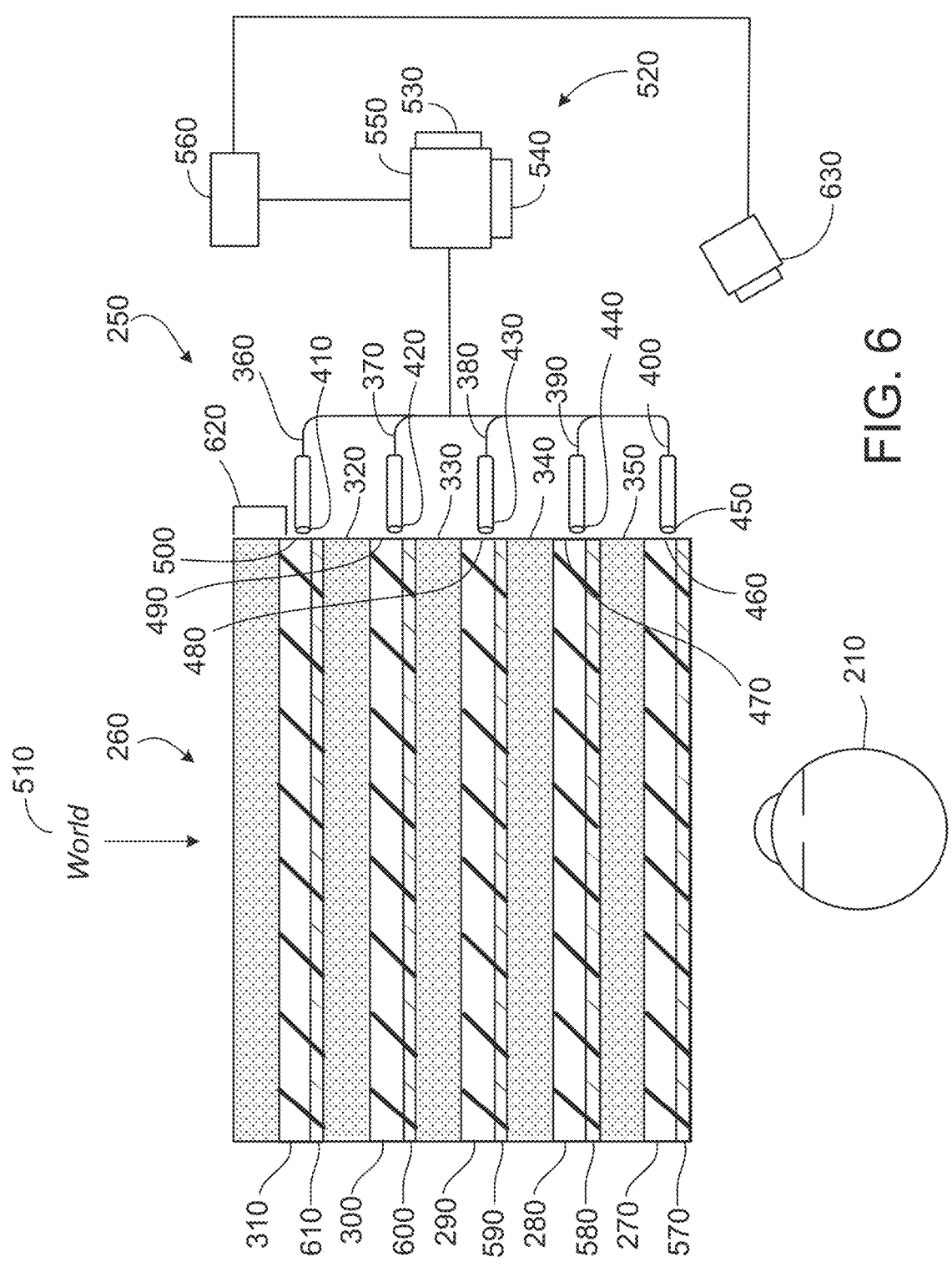
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some implementations. In addition, the waveguide assembly 260 may also be referred to as an eyepiece.

In some implementations, the display system 250 is configured to provide substantially continuous cues to vergence and multiple discrete cues to accommodation. The cues to vergence can be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some implementations, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some implementations, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and can be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some implementations, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some implementations, a single beam of light (e.g., a collimated beam) may be injected into each waveguide to output an entire field of cloned collimated beams that are directed toward the eye 210 at particular angles (and amounts of divergence) corresponding to the depth plane associated with a particular waveguide. In some implementations, a single one of the image injection devices 360, 370, 380, 390, 400 may be associated with and inject light into a plurality (e.g., three) of the waveguides 270, 280, 290, 300, 310.

In some implementations, the image injection devices 360, 370, 380, 390, 400 are discrete displays that each produce image information for injection into a corresponding waveguide 270, 280, 290, 300, 310, respectively. In some other implementations, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some implementations, the light injected into the waveguides 270, 280, 290, 300, 310 is provided by a light projector system 520, which includes a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some implementations, these image injection devices may represent different light paths and locations in a common projection system configured to output light into associated ones of the waveguides 270, 280, 290, 300, 310. In some implementations, the waveguides of the waveguide assembly 260 may function as ideal lens while relaying light injected into the waveguides out to the user's eyes. In this conception, the object may be the spatial light modulator 540 and the image may be the image on the depth plane.

In some examples, μLED displays can be used in light projector system 520. μLED displays can unpolarized light over a large range of angles. Accordingly, LED displays can beneficially provide imagery over wide fields of view with high efficiency.

In some implementations, the display system 250 may be a scanning fiber display including one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some implementations, the illustrated image injection devices 360, 370, 380, 390, 400 may schematically represent a single scanning fiber or a bundle of scanning fibers configured to inject light into one or a plurality of the waveguides 270, 280, 290, 300, 310. In some other implementations, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light module 530, and the light modulator 540. In some implementations, the controller 560 is part of the local processing and data module 140. The controller 560 includes programming (e.g., instructions in a non-transitory medium) that regulates the timing and provision of image information to the waveguides 270, 280, 290, 300, 310 according to, e.g., any of the various schemes disclosed herein. In some implementations, the controller may be a single integral device, or a distributed system connected by wired or wireless communication channels. The controller 560 may be part of the local processing and data module 140 or remote processing module 150 (FIG. 9D) in some implementations.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some implementations, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some implementations, the out-coupling optical elements 570, 580, 590, 600, 610 may be formed in a layer of material that is attached to a transparent substrate to form the waveguides 270, 280, 290, 300, 310. In some other implementations, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first and second lenses 350 and 340 before reaching the eye 210; the combined optical power of the first and second lenses 350 and 340 may be configured to create another incremental amount of wavefront curvature so that the eye/brain interprets light coming from the third waveguide 290 as coming from a second focal plane that is even closer inward toward the person from optical infinity than was light from the next waveguide up 280.

The other layers of waveguide 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the stack of lenses 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative implementations, either or both may be dynamic using electro-active features.

In some implementations, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some implementations, the out-coupling optical elements 570, 580, 590, 600, 610 may be volumetric or surface features, which may be configured to output light at specific angles. For example, the out-coupling optical elements 570, 580, 590, 600, 610 may be volume holograms, surface holograms, and/or diffraction gratings. In some implementations, the features 320, 330, 340, 350 may not be lenses; rather, they may simply be spacers (e.g., cladding layers and/or structures for forming air gaps).

In some implementations, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some implementations, one or more DOEs may be switchable between "on" states in which they actively diffract, and "off" states in which they do not significantly diffract. For instance, a switchable DOE may include a layer of polymer dispersed liquid crystal, in which microdroplets include a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some implementations, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some implementations, the camera assembly 630 may include an image capture device and a light source to project light (e.g., infrared light) to the eye, which may then be reflected by the eye and detected by the image capture device. In some implementations, the camera assembly 630 may be attached to the frame 80 (FIG. 9D) and may be in electrical communication with the local processing and data module 140 and/or remote processing module 150, which may process image information from the camera assembly 630. In some implementations, one camera assembly 630 may be utilized for each eye, to separately monitor each eye.

Figure 7:
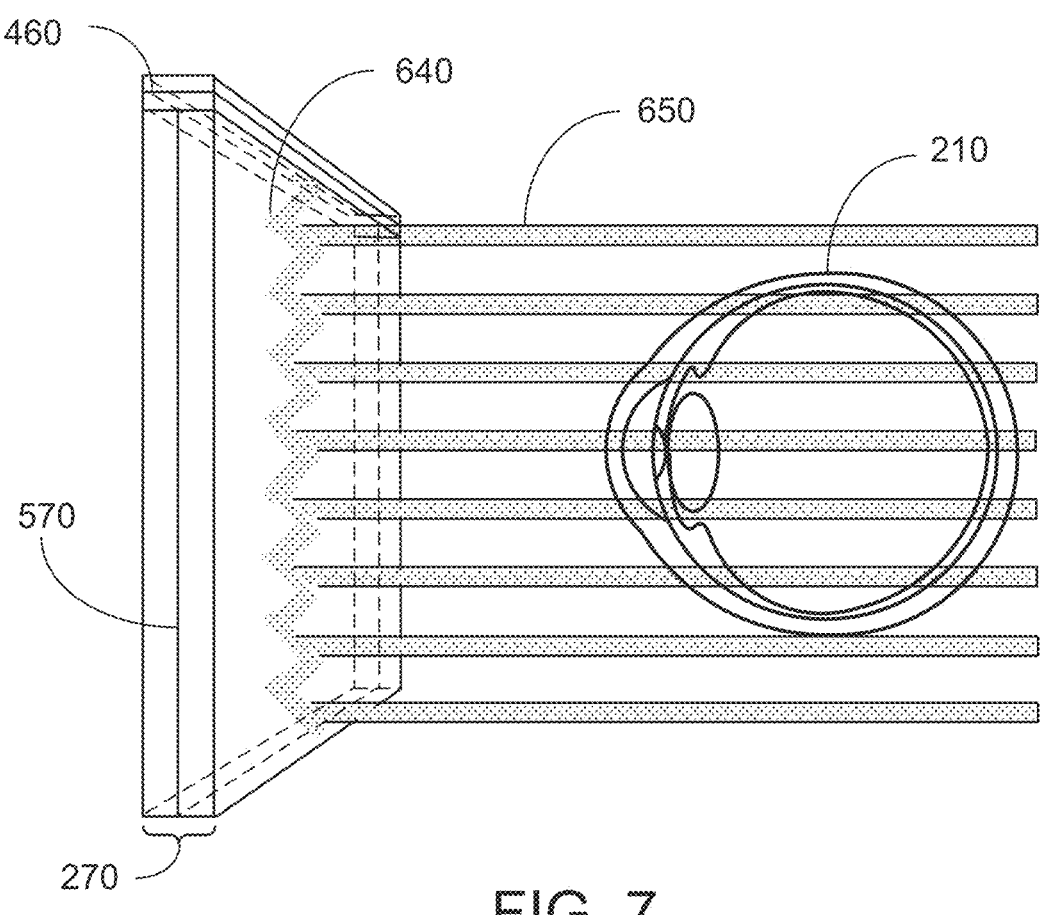
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the out-coupling optical element 570, e.g., a DOE, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
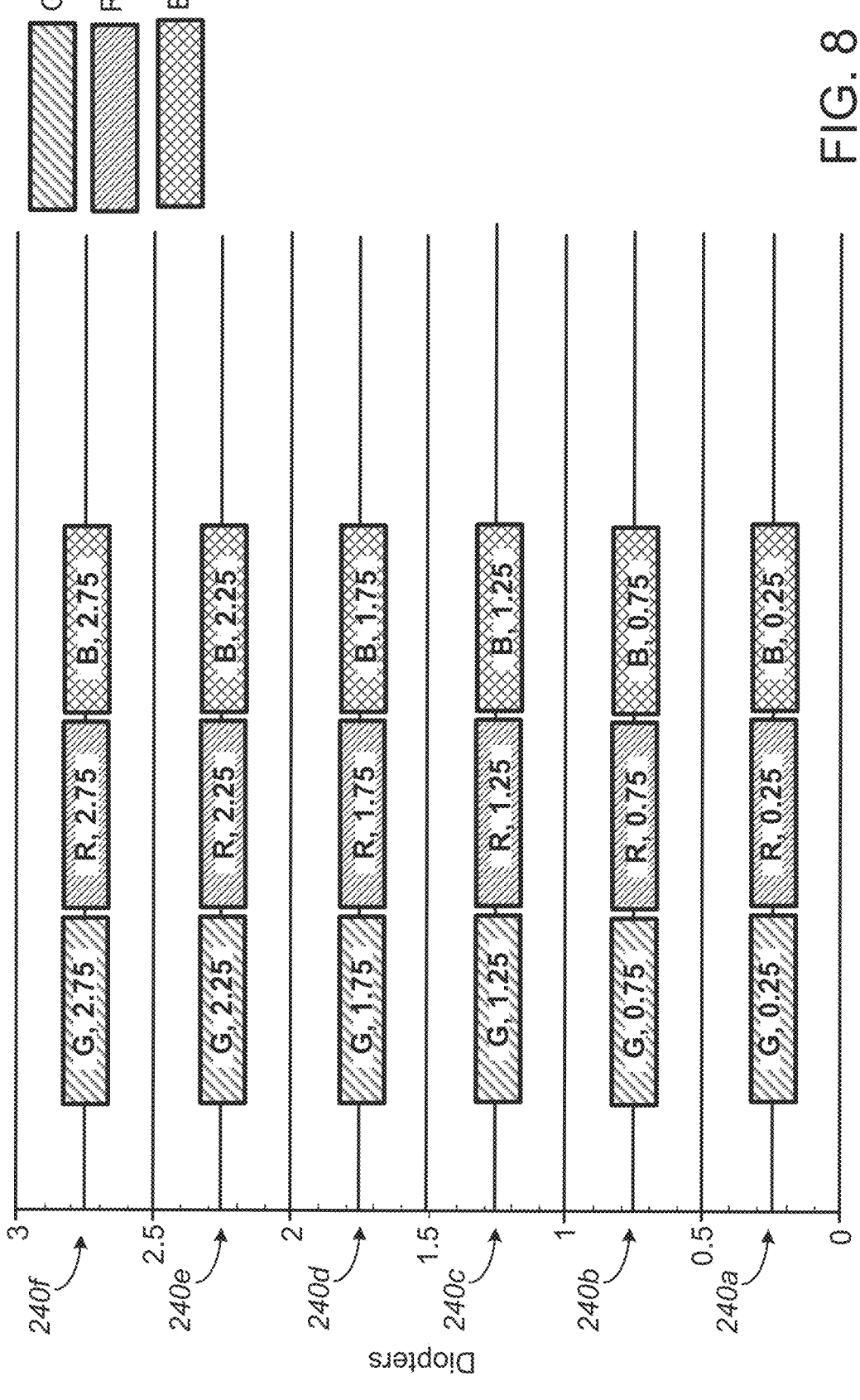
FIG. 8 illustrates an example of a stacked waveguide assembly in which each depth plane includes images formed using multiple different component colors.

In some implementations, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated implementation shows depth planes 240a-240f, although more or fewer depths are also contemplated. Each depth plane may have three or more component color images associated with it, including: a first image of a first color, G; a second image of a second color, R; and a third image of a third color, B.

Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some implementations, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some implementations, light of each component color may be outputted by a single dedicated waveguide and, consequently, each depth plane may have multiple waveguides associated with it. In such implementations, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other implementations, multiple component colors may be outputted by the same waveguide, such that, e.g., only a single waveguide may be provided per depth plane.

With continued reference to FIG. 8, in some implementations, G is the color green, R is the color red, and B is the color blue. In some other implementations, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some implementations, the light module 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display system 250 may be configured to direct and emit this light out of the display towards the user's eye 210, e.g., for imaging and/or user stimulation applications.

Figure 9A:
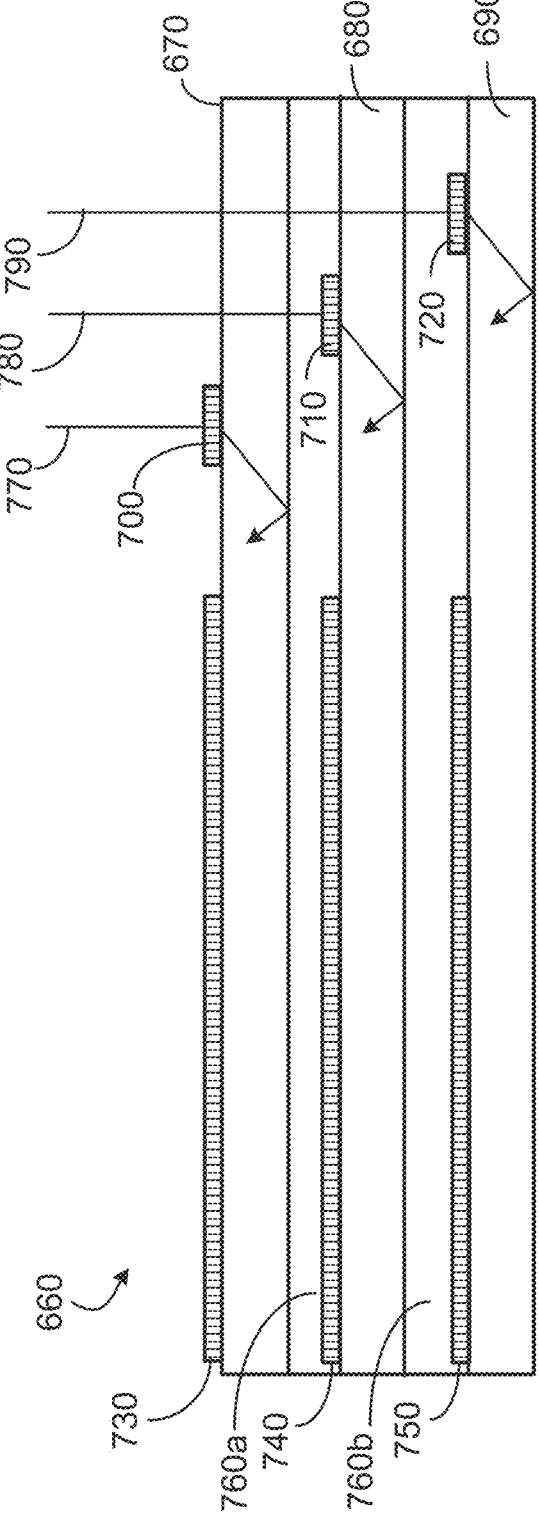
FIG. 9A illustrates a cross-sectional side view of an example of a set of stacked waveguides that each includes an incoupling optical element.

With reference now to FIG. 9A, in some implementations, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the set 660 of stacked waveguides may correspond to the waveguide assembly 260 (FIG. 6) and the illustrated waveguides of the set 660 of stacked waveguides may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some implementations, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some implementations, the in-coupling optical elements 700, 710, 720 may be disposed in the body of the respective waveguide 670, 680, 690. In some implementations, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some implementations.

As illustrated, the in-coupling optical elements 700, 710, 720 may be laterally offset from one another. In some implementations, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other implementations, the light distributing elements 730, 740, 750, may be disposed on a bottom major surface of associated waveguides 670, 680, 690, respectively. In some other implementations, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some implementations, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some implementations, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some implementations, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some implementations, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some implementations, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect light rays 770, which has a first wavelength or range of wavelengths, while transmitting light rays 780 and 790, which have different second and third wavelengths or ranges of wavelengths, respectively. The transmitted light rays 780 impinge on and are deflected by the in-coupling optical element 710, which is configured to deflect light of a second wavelength or range of wavelengths. The light ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
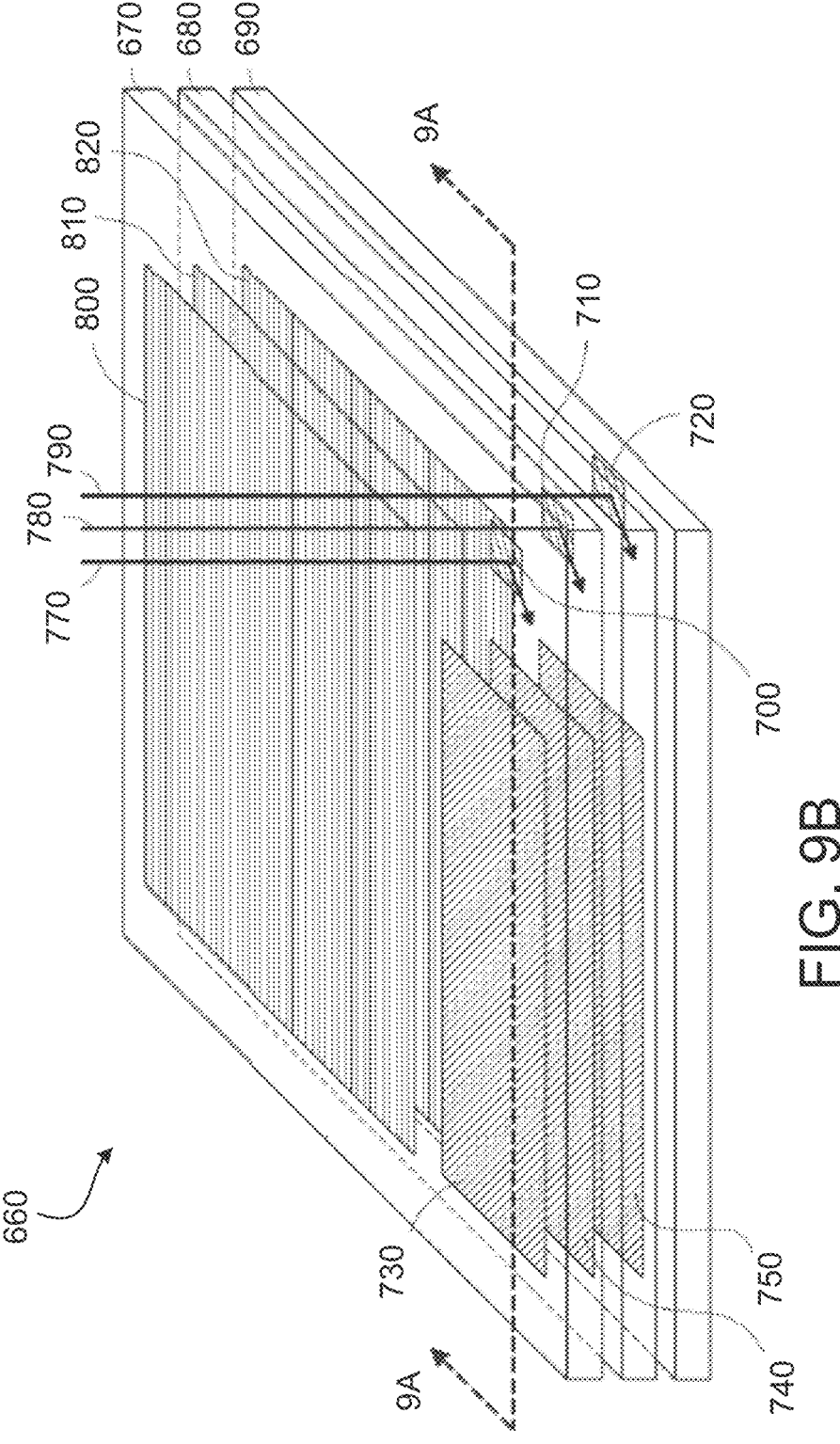
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some implementations, the light distributing elements 730, 740, 750 are orthogonal pupil expanders (OPE's). In some implementations, the OPE's deflect or distribute light to the out-coupling optical elements 800, 810, 820 and, in some implementations, may also increase the beam or spot size of this light as it propagates to the out-coupling optical elements. In some implementations, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some implementations, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some implementations, the OPE and/or EPE may be configured to modify a size of the beams of light.

Accordingly, with reference to FIGS. 9A and 9B, in some implementations, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
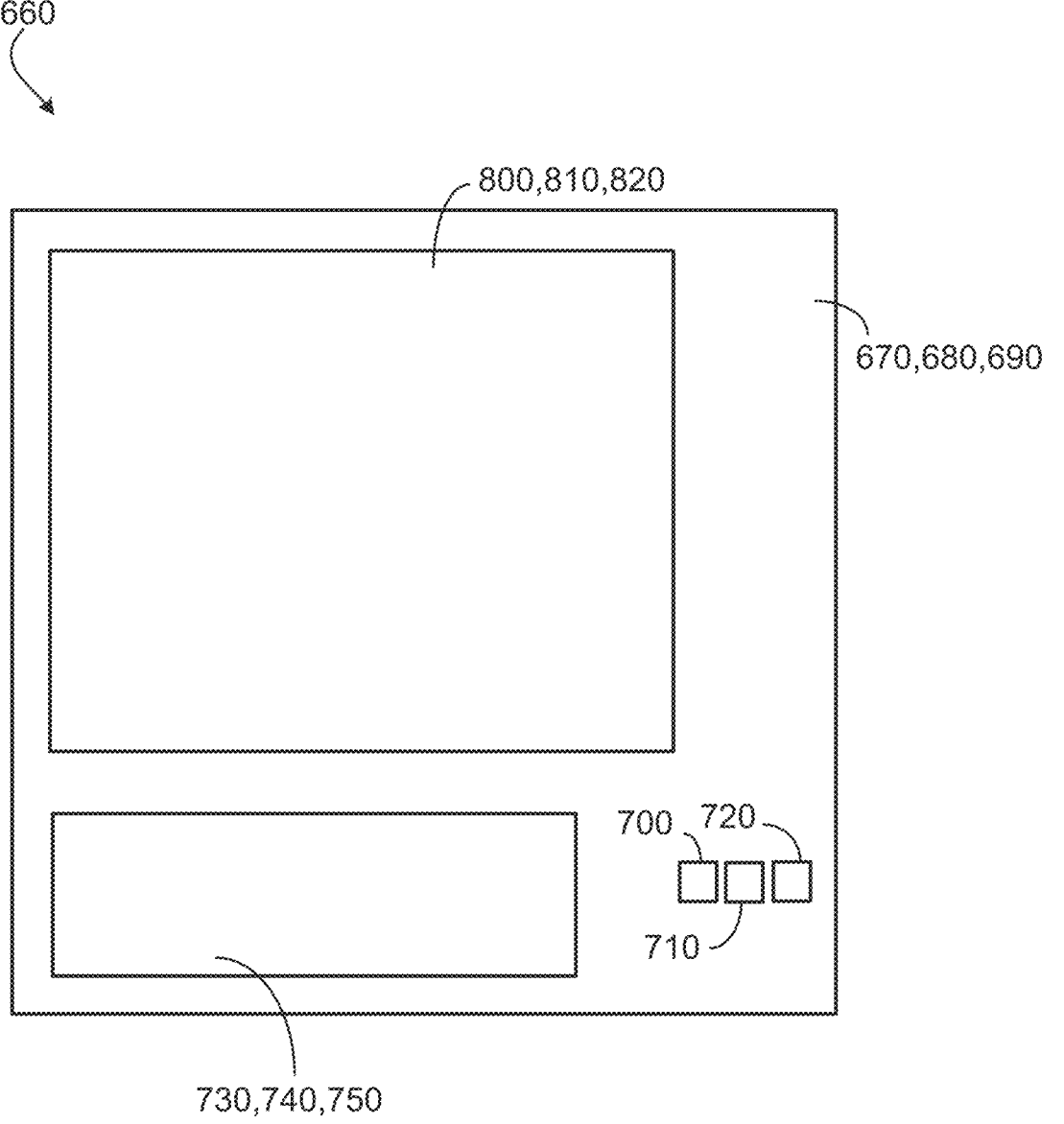
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some implementations, arrangements including nonoverlapping spatially-separated in-coupling optical elements may be referred to as a shifted pupil system, and the in-coupling optical elements within these arrangements may correspond to sub pupils.

Alternatively, in certain implementations, two or more of the in-coupling optical elements can be in an inline arrangement, in which they are vertically aligned. In such arrangements, light for waveguides further from the projection system is transmitted through the in-coupling optical elements for waveguides closer to the projection system, preferably with minimal scattering or diffraction.

Inline configurations can advantageously reduce the size of and simplify the projector. Moreover, it can increase the field of view of the eyepiece, e.g., by coupling of same color to several waveguides by making use of crosstalk. For example, green light can be coupled into blue and red active layers. Because of the pitch of each ICG can be different to provide improved (e.g., optimal) performance for a specific color, the allowed field of view can be increased.

In inline configurations, except for the last layer in the optical path, the ICGs should be either at most partially reflective or otherwise transmissive to light having operative wavelengths of subsequent layers in the waveguide stack. In either case, the efficiency can be undesirably low unless the gratings are etched in a high index layer (e.g., 1.8 or more for polymer based layers), or a high index coating is deposited or growth on the grating. However, this approach can increase the back reflection into the projector lens, which thus can generate image artifacts such as image ghosting.

Figure 9D:
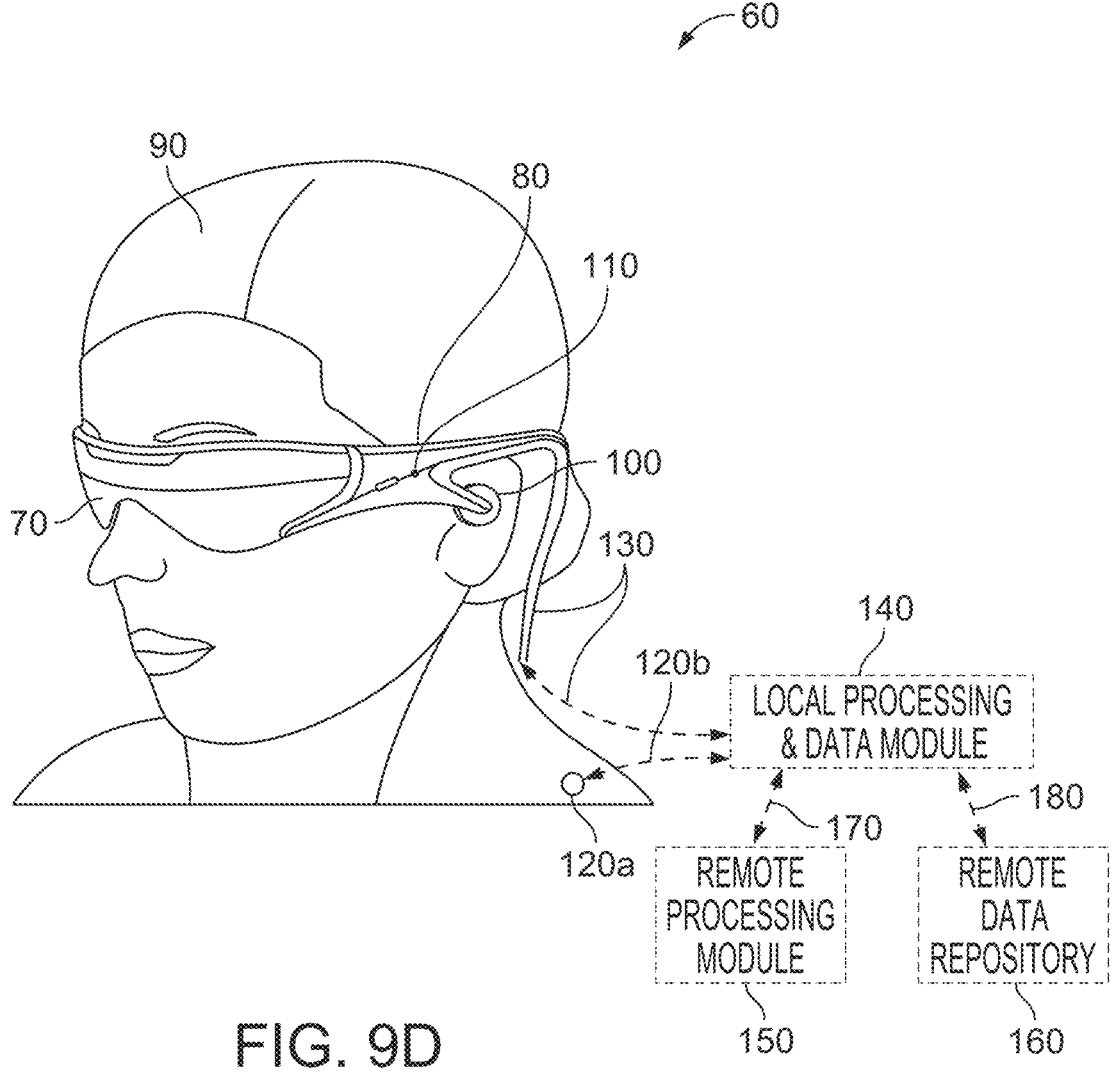
FIG. 9D illustrates an example of wearable display system.

FIG. 9D illustrates an example of wearable display system 60 into which the various waveguides and related systems disclosed herein may be integrated. In some implementations, the display system 60 is the display system 250 of FIG. 6, with FIG. 6 schematically showing some parts of that display system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or user 90 and which is configured to position the display 70 in front of the eyes of the user 90. The display 70 may be considered eyewear in some implementations. In some implementations, a speaker 100 is coupled to the frame 80 and configured to be positioned adjacent the ear canal of the user 90 (in some implementations, another speaker, not shown, may optionally be positioned adjacent the other ear canal of the user to provide stereo/shapeable sound control). The display system 60 may also include one or more microphones 110 or other devices to detect sound. In some implementations, the microphone is configured to allow the user to provide inputs or commands to the display system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some implementations, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some implementations. For example, the sensor 120a may be an electrode.

With continued reference to FIG. 9D, the display 70 is operatively coupled by communications link 130, such as by a wired lead or wireless connectivity, to a local processing and data module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processing and data module 140. The local processing and data module 140 may include a hardware processor, as well as digital memory, such as non-volatile memory (e.g., flash memory or hard disk drives), both of which may be utilized to assist in the processing, caching, and storage of data. Optionally, the local processing and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote processing module 150 and remote data repository 160 are operatively coupled to each other and available as resources to the local processing and data module 140. In some implementations, the local processing and data module 140 may include one or more of the image capture devices, microphones, inertial measurement units, accelerometers, compasses, GPS units, radio devices, and/or gyros. In some other implementations, one or more of these sensors may be attached to the frame 80, or may be standalone structures that communicate with the local processing and data module 140 by wired or wireless communication pathways.

With continued reference to FIG. 9l), in some implementations, the remote processing module 150 may include one or more processors configured to analyze and process data and/or image information, for instance including one or more central processing units (CPUs), graphics processing units (GPUs), dedicated processing hardware, and so on. In some implementations, the remote data repository 160 may include a digital data storage facility, which may be available through the internet or other networking configuration in a "cloud" resource configuration. In some implementations, the remote data repository 160 may include one or more remote servers, which provide information, e.g., information for generating augmented reality content, to the local processing and data module 140 and/or the remote processing module 150. In some implementations, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, local processing and data module 140, remote processing module 150, and remote data repository 160, for instance via wireless or wired connections.

Diffraction Gratings Having Reduced Polarization Sensitivity

Providing a high quality immersive experience to a user of waveguide-based display systems such as various display systems configured for virtual/augmented/mixed display applications described supra, depends on, among other things, various characteristics of the light coupling into and/or out of the waveguides in the eyepiece of the display systems. For example, a virtual/augmented/mixed display having high light incoupling and outcoupling efficiencies can enhance the viewing experience by increasing brightness of the light directed to the user's eye. As discussed above, in-coupling optical elements such as in-coupling diffraction gratings may be employed to couple light into the waveguides to be guided therein by total internal reflection. Similarly, out-coupling optical elements such as out-coupling diffraction gratings may be employed to couple light guided within the waveguides by total internal reflection out of the waveguides.

As described supra, e.g., in reference to FIGS. 6 and 7, display systems according to various implementations described herein may include optical elements, e.g., in-coupling optical elements, out-coupling optical elements, light distributing elements, and/or combined pupil expander-extractors (CPEs) that may include diffraction gratings. As disclosed herein, a CPE may operate both as a light distributing element spreading or distributing light within the waveguide, possibly increasing beam size and/or the eye box, as well as an out-coupling optical element coupling light out of the waveguide.

For example, as described above in reference to FIG. 7, light 640 that is injected into the waveguide 270 at the input surface 460 of the waveguide 270 propagates and is guided within the waveguide 270 by total internal reflection (TIR). In various implementation, at points where the light 640 impinges on the out-coupling optical element 570, a portion of the light guided within the waveguide may exit the waveguide as an exit beam 650, e.g., beamlets. In some implementations, any of the optical elements 570, 580, 590, 600, 610, which may include one or more of an incoupling optical element, an outcoupling optical element, a light distribution element or a CPE, can be configured as a diffraction grating.

To achieve desirable characteristics of in-coupling of light into (or out-coupling of light from) the waveguides 270, 280, 290, 300, 310, the optical elements 570, 580, 590, 600, 610 configured as diffraction gratings can be formed of a suitable material and have a suitable structure for controlling various optical properties, including diffraction properties such as diffraction efficiency as a function of polarization. Possible desirable diffraction properties may include, among other properties, any one or more of the following: spectral selectivity, angular selectivity, polarization selectivity (or non-selectivity), high spectral bandwidth, high diffraction efficiencies or a wide field of view (FOV).

Some diffraction gratings have strong polarization dependence and thus may have relatively diminished overall efficiency (due to the rejection of one polarization). Such diffraction gratings may also create coherent artifacts and reduce the uniformity of a far field image. To provide diffraction gratings that have reduced polarization sensitivity (e.g., that couple light with an efficiency that is relatively independent of polarization), some displays for AR systems according to implementation described herein include a waveguide with blazed diffraction gratings formed therein. The blazed grating may, for example, include diffractive features having a "saw tooth" shape. In some implementations, a blazed grating may achieve enhanced grating diffraction efficiency for a given diffraction order, while the diffraction efficiency for the other orders is reduced or minimized. As a result, more light may be directed into the particular given diffractive order as opposed to any of the other orders in some implementations.

Figure 10A:
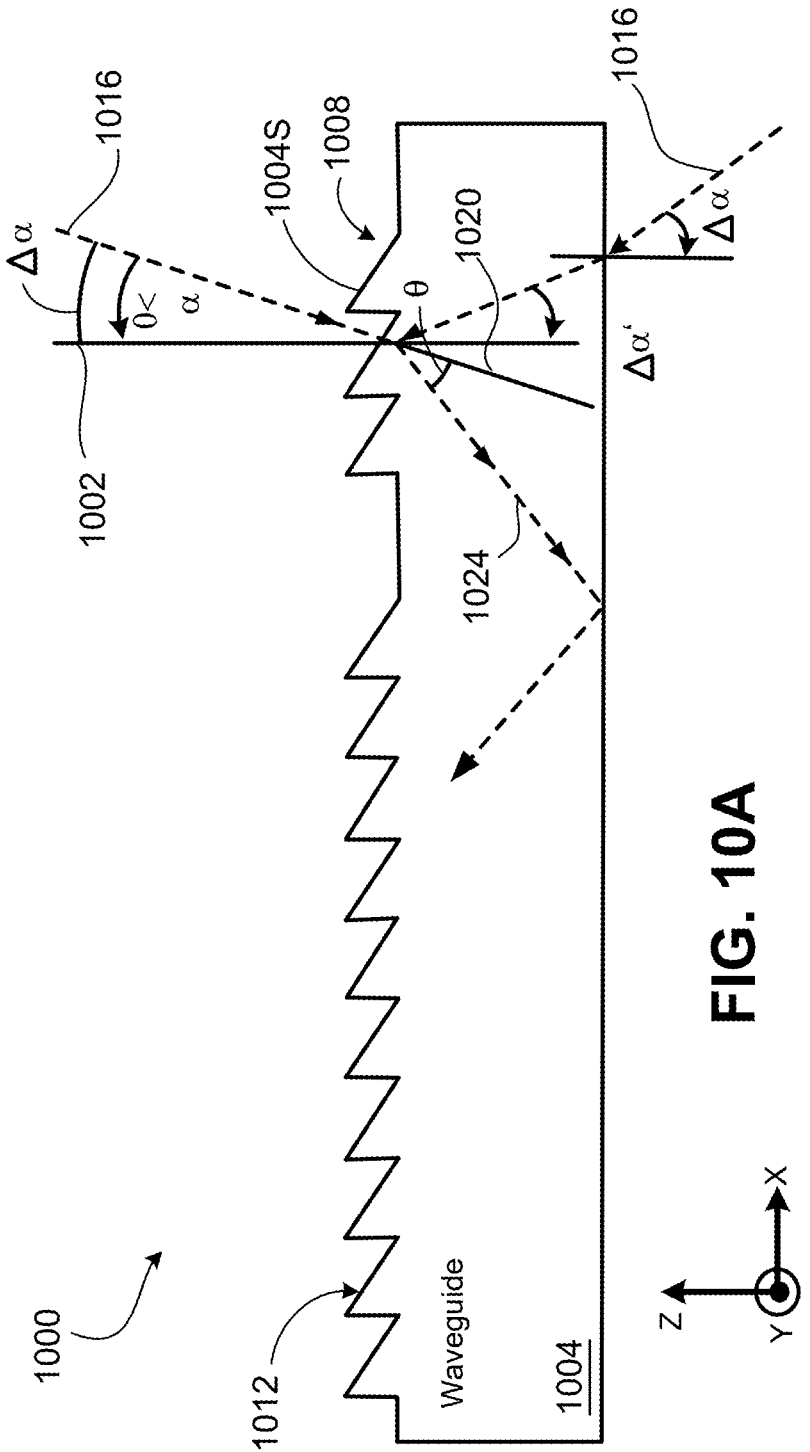
FIG. 10A schematically illustrates a cross-sectional view of a portion of a waveguide having disposed thereon a diffraction grating, for example, for in-coupling light into the waveguide.

FIG. 10A illustrates a cross-sectional view of a portion of a display device 1000 such as an eyepiece including a waveguide 1004 and a blazed diffraction grating 1008 formed on the substrate that is a waveguide 1004, according to some designs described herein. In the implementation shown, the blazed diffraction grating 1008 is formed in the substrate/waveguide 1004 (which, in this example, is planar). The surface of the substrate or waveguide 1004 has a surface topography including diffractive features that together form the diffraction grating 1008. The blazed diffraction grating 1008 is configured to diffract light having a wavelength in the visible spectrum such that the light incident thereon is guided within the waveguide 1004 by TIR. The waveguide 1004 may be transparent and may form part of an eyepiece through which a user's eye can see. Such a waveguide 1004 and eyepiece may be included in a head mounted display such as an augmented reality display. The waveguide 1004 can correspond, for example, to one of waveguides 670, 680, 690 described above with respect to FIGS. 9A-9C, for example. The blazed diffraction grating 1008 can correspond to one of the in-coupling optical elements 700, 710, 720 described above with respect to FIGS. 9A-9C, for example. The blazed diffraction grating 1008 configured to in-couple light into the waveguide 1004 may be referred to herein as an in-coupling grating (ICG). The display device 1000 may additionally include an optical element 1012, that can correspond, for example, to a light distributing element (e.g., one of the light distributing elements 730, 740, 750 shown in FIGS. 9A-9C), or an out-coupling optical element (e.g., one of the out-coupling optical elements 800, 810, 820 shown in FIGS. 9A-9C).

In operation, when an incident light beam 1016, e.g., visible light, such as from a light projection system that provide image content is incident on the blazed diffraction grating 1008 at an angle of incidence, u, measured relative to a plane normal 1002 that is normal or orthogonal to the extended surface or plane of the blazed diffraction grating or the substrate/waveguide and/or the surface 1004S of the waveguide 1004, for example, a major surface of the waveguide on which the grating is formed (shown in FIG. 10A as extending parallel to the y-x plane), the blazed diffraction grating at least partially diffracts the incident light beam 1016 as a diffracted light beam 1024 at a diffraction angle θ measured relative to the plane normal 1002. When the diffracted light beam 1024 is diffracted at a diffraction angle θ that exceeds a critical angle $\theta_{TIR}$ for occurrence of total internal reflection in the waveguide 1004, the diffracted light beam 1024 propagates and is guided within the waveguide 1004 via total internal reflection (TIR) generally along a direction parallel to the x-axis and along the length of the waveguide. A portion of this light guided within the waveguide 1004 may reach one of light distributing elements 730, 740, 750 or one of out-coupling optical elements (800, 810, 820, FIGS. 9A-9C), for example, and be diffracted again.

As described herein, a light beam that is incident at an angle in a clockwise direction relative to the plane normal 1002 (i.e., on the right side of the plane normal 1002) as in the illustrated implementation is referred to as having a negative angle of incidence α (α<0), whereas a light beam that is incident at an angle in a counter-clockwise direction relative to the plane normal 1002 (i.e., on the left side of the plane normal) is referred to as having a positive angle of incidence α (α>).

As further described elsewhere in the specification, a suitable combination of high index material and/or the structure of the diffraction grating 1008 may result in a particular range (Aa) of angle of incidence α, referred to herein as a range of angles of acceptance or a field-of-view (FOV). One range, αα, may be described by a range of angles spanning negative and/or positive values of a, outside of which the diffraction efficiency falls off by more than 10%, 25%, more than 50%, or more than 75%, 80%, 90%, 95%, or any value in a range defined by any of these values, relative to the diffraction efficiency at α=0 or some other direction. In some implementations, having a range Δα in which the diffraction efficiency is relatively high and constant may be desirable, e.g., where a uniform intensity of diffracted light is desired within the range Δα. Thus, in some implementations, the range Δα is associated with the angular bandwidth of the diffraction grating 1008, such that an incident light beam 1016 within the range Δα is efficiently diffracted by the diffraction grating 1008 at a diffraction angle θ with respect to the plane normal 1002 (e.g., a direction parallel to the y-z plane) wherein θ exceeds $\theta_{TIR}$ such that the diffracted light is guided within the waveguide 1004 under total internal reflection (TIR). In some implementations, this range Δα may affect the field-of-view seen by the user. It will be appreciated that, in various implementations, the light can be directed onto the in-coupling grating (ICG) from either side. For example, the light can be directed through the substrate or waveguide 1004 and be incident onto a reflective in-coupling grating (ICG) 1008 such as the one shown in FIG. 10A. The light may undergo the same effect, e.g., be coupled into the substrate or waveguide 1004 by the in-coupling diffraction grating 1008 such that the light is guided within the substrate or waveguide by total internal reflection. The range (Δα) of angle of incidence α, referred to herein as a range of angles of acceptance or a field-of-view (FOV) may be affected by the index of refraction of the substrate or waveguide material. In FIG. 10A, for example, a reduced range of angles (Δα'), shows the effects of refraction of the high index material on the light incident on the in-coupling grating (ICG). The range of angles (Δα) or FOV, however, is larger.

Figure 10B:
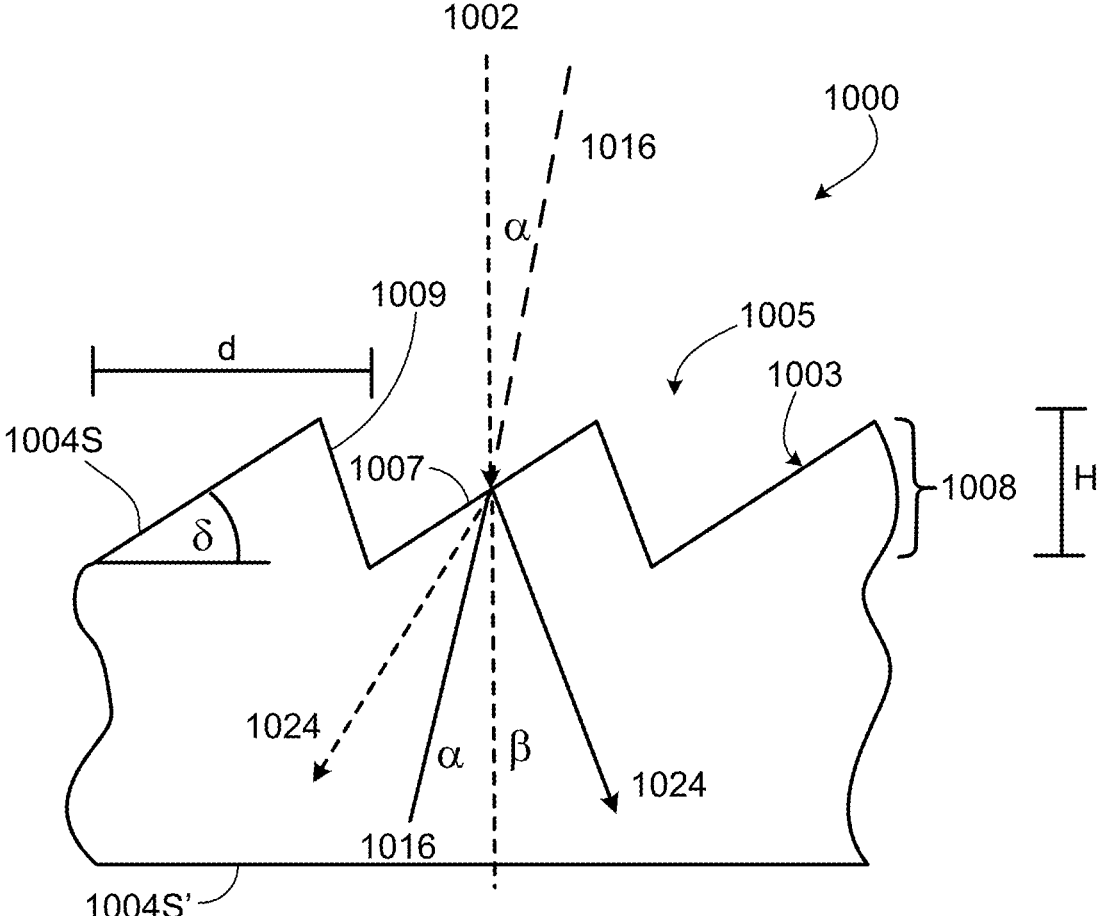
FIG. 10B illustrates a cross-sectional view of a waveguide having disposed thereon a blazed diffraction grating showing a field-of-view (FOV) of the waveguide, for range of angle of incidence Δα.

FIG. 10B illustrates a cross-sectional view of an example blazed transmission diffraction grating 1008. The diffraction grating 1008 includes grating features having peaks 1003 and grooves 1005. The blazed transmission diffraction grating 1008 includes a surface corresponding to the surface 1004S of the substrate or waveguide having a "sawtooth" shape pattern as viewed from the cross-section shown. The "sawtooth" patterned is formed by first sloping portions 1007 of the surface 1004S. In the example shown in FIG. 10B, the diffraction grating 1008 also includes second (steeper) sloping portions 1009. In the example shown, first sloping portions 1007 have a shallower inclination than the second sloping portions 1009, which have a steeper inclination. The first sloping portions 1007 also are wider than the second sloping portions 1009 in this example.

The peaks 1003 have heights, H, corresponding to the vertical distance from the bottom of the groove 1005 to the top of the peak 1003. Accordingly, this value may be referred to herein as the peak height and/or groove depth, as the grating height or grating depth or as the height of the diffractive features of the diffraction grating. In some implementations, the height H of neighboring ridges can differ, e.g., can follow a gradient. In the example shown in FIG. 10B, the bottom of the groove 1005 is formed by an intersection of the first and second sloping portions 1007, 1009 of two adjacent peaks 1003. The first sloping portion 1007 is on one of the adjacent peaks 1003 and the second sloping portion 1009 is on the other adjacent peak. Similarly, the top of the peak 1003 is formed by an intersection of the first and second sloping portions 1007, 1009 at the top of the peak 1003. Other configurations, however, are possible. For example, the first and second sloping portions may not necessarily intersect, for example, if the bottom of the groove 1005 has a flat base or if the top of the peak 1003 includes a flat plateau as will be discussed below. The blazed diffraction grating 1008 has a line spacing or pitch, d, which may be constant in some implementations. This line spacing or pitch, d, may be a measure, for example, of the separation the apex's of the peaks 1003 in the diffraction grating 1008 having a similar shape as that shown in FIG. 10B. Similarly, the line spacing or pitch, d, may be a measure of the separation of the deepest location of adjacent grooves 1005. The line spacing or pitch, d, may be measured from other positions on the grating features.

The slopes can be tilted at an angle, δ, with respect to a plane parallel to the surface of the diffraction grating 1008 or waveguide (e.g., the surface 1004S of the waveguide, which may extend beyond the grating or the surface 1004S' of the waveguide opposite the grating of FIG. 10A). This angle, δ, of the first (shallower) sloping portion 1007 may be referred to herein as the blaze angle.

As illustrated in FIG. 10B, the blazed diffraction grating 1008 can include grating lines or features that have asymmetric shape, for example, that include asymmetrically shaped peaks 1003 and/or grooves 1005. For example, in the diffraction grating shown in FIG. 10B, the diffraction features include peaks 1003 and/or grooves 1005 having an asymmetrical triangular cross-sectional shape. As discussed above, this asymmetric shape results in the different inclinations and/or widths of the first and second sloping portions 1007, 1009. Other shapes, however, are possible.

In designs where the diffraction features are asymmetric, for example, where the inclination of the first sloping portion is shallower while the slope of the second sloping portion is steeper, the diffraction features may be formed from repeating slopes and steps. Such structures may be referred to herein as a tilted step structure. In some implementations, the second portion may be so steep as to not slope; for example, the second portion may be parallel to the plane normal 1002.

In other implementations of the "sawtooth" pattern, however, the peaks 1003 and/or grooves 1005 may be symmetric. For example, the first and second sloping portions 1007, 1009 may have the same inclination and be the same width.

The cross-section pattern shown in FIG. 10B may be referred to herein as a single-step geometry, in comparison to a multi-step structure, which are also possible.

Regardless of whether the diffraction features are asymmetric or symmetric, in some implementations, a plateau or flat portion may be located at the top of the peak 1003 as will be discussed below. Diffraction gratings 1008 including diffraction features having plateaus or flat portions on top of the peaks 1003 are shown, for example, in FIG. 11B.

FIG. 10B shows an incident light beam 1016 incident on the diffraction grating 1008 at an angle α with respect to the plane normal 1002. (As discussed above with regard to FIG. 10A, the light can pass through the substrate or waveguide 1004 and be incident on the diffraction grating 1008 from the other side in other examples.) As discussed above, the plane normal 1002 is normal or orthogonal to the extended surface of the blazed diffraction grating 1008 or the plane of the grating or waveguide and/or the surface 1004S of the waveguide 1004, for example, a major surface of the waveguide on which the grating is formed or the opposite planar surface 1004S'. In FIG. 10B, the incident light beam 1016 incident on the diffraction grating 1008 is shown as diffracted at an angle β with respect to the plane normal 1002.

When configured as an in-coupling optical element or an in-coupling diffraction grating, the diffraction grating 1008 can diffractively couple light incident into the substrate 1004, which can be a waveguide as described above. The diffraction grating 1008 may, if desired, be configured as an out-coupling optical element and, in such implementations, can diffractively couple light from the substrate 1004, which can be a waveguide also as described above.

Referring to FIGS. 10A and 10B, in some implementations, the substrate 1004 includes a high index material having an index of refraction of at least 1.9. The index of refraction, for example, can be at least 2.0, at least 2.1, at least 2.2, or at least 2.3 and may be no more than 2.4, 2.5, 2.6, 2.7, 2.8, or may be in any range formed by any of these values or may be outside these ranges. In some implementations, for example, the substrate includes a Ti-, Ta-, or Li-based oxide. In various examples disclosed herein, the diffractive features of the diffractive grating 1008 may be formed at a surface of the substrate 1004. The diffractive features may either be formed in the substrate 1004, e.g., a waveguide, or in a separate layer formed over the substrate 1004, e.g., a waveguide, and configured to optically communicate with the substrate 1004, e.g., couple light into or out of the substrate 1004. In the illustrated example, the diffractive features of the diffraction grating 1008 such as lines are formed in the substrate 1004 such as in the surface of the substrate. The diffractive features, for example, may be etched into the substrate 1004 including high index material such as a Ti-, Ta-, or Li-based oxide. The substrate may, for example, include lithium niobate and the diffractive grating may be formed in the lithium niobate substrate by etching or patterning the surface of the substrate. Other materials having high refractive indices may also be used. For example, other materials including lithium such as lithium oxides, e.g., lithium tantalate ($LiTaO_3$) may be employed as a substrate. Silicon carbide (SiC) is another option for the substrate material. Examples are not so limited. In other examples, the diffractive features of the diffractive grating 1008 may be formed in a separate layer disposed over, e.g., physically contacting, the substrate 1004. For example, a thin film coating of under 200 nm thickness of zinc oxide (ZnO), silicon nitride ($Si_3N_4$), zirconium dioxide ($ZrO_2$), titanium dioxide ($TiO_2$), silicon carbide (SiC), etc., may be disposed over an existing high index substrate. The thin film coating may be patterned to form the diffractive features. In some implementations, however, diffractive features, such as lines, of a diffraction grating 1008 may be formed of a material different from that of the substrate. The substrate may, for example, include a high index material such as a Ti-, Ta-, or Li-based oxide (e.g., lithium niobate, $LiNbO_3$, or lithium tantalate, $LiTaO_3$), however, the diffractive features may be formed from a different material such as coatings of zinc oxide (ZnO), zirconium dioxide ($ZrO_2$), titanium dioxide ($TiO_2$), silicon carbide (SiC) or other materials described herein. In some implementations, this other material formed on the substrate may have a lower index of refraction. In some cases, the substrate 1004 can include, for example, materials (including amorphous high index glass substrates) such as materials based on silica glass (e.g., doped silica glass), silicon oxynitride, transition metal oxides (e.g., hafnium oxide, tantalum oxide, zirconium oxide, niobium oxide, aluminum oxide (e.g., sapphire)), plastic, a polymer, or other materially optically transmissive to visible light having, e.g., a suitable refractive index as described above, that is different from the material of the Ti-, Ta-, or Li-based oxide features.

However, as described above, in various implementations described herein, the diffraction gratings 1008 and the substrate 1004 or waveguide both include the same material, e.g., a Ti-, Ta-, or Li-based oxide. In some implementations, the diffraction gratings 1008 are patterned directly into the substrate 1004, such that the diffraction gratings 1008 and the substrate 1004 form a single piece or a monolithic structure. For example, the substrate 1004 includes a waveguide having the diffraction grating 1008 formed directly in the surface of the waveguide or substrate. In these implementations, a bulk Ti-, Ta-, or Li-based oxide material may be patterned at the surface 1004S to form the diffraction gratings 1008, while the Ti-, Ta-, or Li-based oxide material below the diffraction gratings 1008 may form a waveguide. In yet some other implementations, the bulk or substrate 1004 and the surface 1004S patterned to form the diffraction gratings 1008 include different Ti-, Ta-, or Li-based oxides. For example, a bulk Ti-, Ta-, or Li-based oxide material patterned at the surface region to form the diffraction gratings 1008 may be formed of a first Ti-, Ta-, or Li-based oxide material, while the Ti-, Ta-, or Li-based oxide material below the diffraction gratings 1008 that form the substrate 1004 or the substrate region may be formed of a second Ti-, Ta-, or Li-based oxide material different from the first Ti-, Ta-, or Li-based oxide material. As discussed above, in some other implementations, the diffraction gratings 1008 include of different high-index material such as zirconium dioxide (ZrO2), titanium dioxide (TiO2), silicon carbide (SiC), etc. and the material below the diffraction gratings 1008 that form the substrate 1004 or the substrate region may be formed of a second material such as LiTaO3, LiNbO3, etc. and different from the first material coated as a thin film.

In the illustrated example in FIGS. 10A and 10B, the diffraction grating 1008 may include a plurality of blazed diffraction grating lines that are elongated in a first horizontal direction or the y-direction and periodically repeat in a second horizontal direction or the x-direction. The diffraction grating lines can be, e.g., straight and continuous lines extending in the y-direction. However, implementations are not so limited. In some implementations, the diffraction grating lines can be discontinuous lines, e.g., in the y direction. In some other implementations, the discontinuous lines can form a plurality of pillars protruding from a surface of the grating substrate. In some implementations, at least some of the diffraction grating lines can have different widths in the x-direction.

In the illustrated example, the diffraction grating lines of the diffraction grating 1008 have a profile, e.g., a sawtooth profile, having asymmetric opposing side surfaces forming different angles with respect to a plane of the substrate. However, implementations are not so limited and in other implementations, the diffraction grating lines can have symmetric opposing side surfaces forming similar angles with respect to a plane of the substrate.

Referring to FIGS. 10A and 10B, according to various implementations, the diffraction gratings 1008 may have various dimensions. For example, the diffractive features of the diffraction gratings 1008 may have a height (H) of 10 nm or 40 nm to 150 nm or 200 nm, 50 nm to 110 nm, 60 nm to 100 nm, 70 nm to 90 nm, or about 80 nm or a height in a range defined by any of these values, according to implementations. This height may correspond to the height of the peaks 1003 and/or the depth of the grooves 1005. Such heights with a blaze geometry in high index material may provide a diffraction grating with reduced polarization sensitivity. Other heights, however, might be possible.

The diffraction gratings 1008 may have a pitch of 250 nm to 350 nm, 300 nm to 400 nm, 250 nm to 450 nm, or a pitch in any range defined by any of these values, according to various implementations. Other pitches are also possible.

In some implementations, the diffraction gratings 1008 may have blaze angles of about 10 to 70 degrees (shallow size) and anti-blaze angles (steep side) of 140 to 70 degrees or any value in a range defined by these values. Values outside these ranges, as discussed below, are also possible.

In general, blazed diffraction gratings of either single-step or multi-step geometry are possible and a variety of techniques can be used to form the gratings. In the example shown in FIGS. 11A-11B, gratings can be formed by depositing blazed photoresist and then etching and patterning the photoresist.

Example methods of forming blazed gratings and examples of various blazed grating geometries are described in US20210072437A1, entitled "Display device with diffraction grating having reduced polarization sensitivity," the entire contents of which are incorporated herein by reference. The methods disclosed in this publication can be applied to the curved and multifaceted antiblaze structures disclosed herein.

Figure 11A:
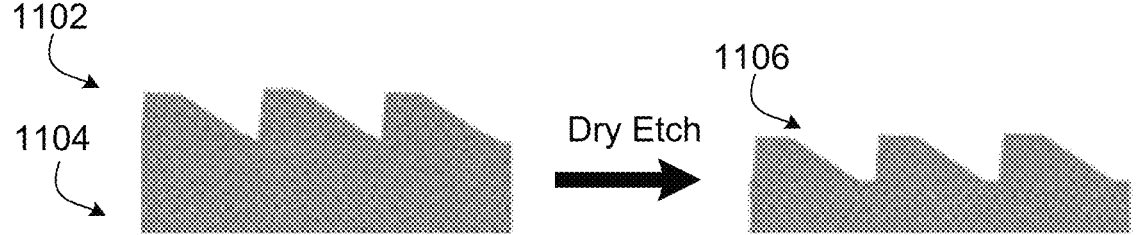
FIG. 11A shows cross-sectional views of portions of a grating structure in which a grating pattern is transferred from a resist layer to a substrate layer by dry etching.

FIG. 11A illustrates the formation of a single-step blazed grating 1106 in a substrate 1104, which may be a waveguide 1004 (FIG. 10A). A patternable material such as photoresist 1102 is deposited onto a substrate 1104, which can be or include a waveguide. The patternable material/photoresist 1102 is patterned to have a shape of the blazed grating. Forming a blazed geometry in the photoresist 1102 may, in some implementations, involve imprinting a pattern such as a single-step "sawtooth" pattern in the photoresist 1102 (e.g., depositing photoresist on the substrate 1104 and then imprinting the blazed geometry). The photoresist 1102 may include a mask such as a hard mask. The patterned photoresist 1102 and the substrate 1104 may then be etched to form a blazed pattern in substrate 1104. Etching the photoresist 1102 and the substrate 1104 may involve a dry plasma or chemical etch and/or a wet chemical etch, for example. In some implementations, the etching illustrated in FIG. 11A may etch away material at a relatively constant rate, such that portions where the patterned photoresist was the thickest result in a relatively smaller amount of removal, e.g., negligible or no removal, of the material from the substrate, while portions where the patterned photoresist was the thinnest (or non-existent) result in a relatively large amount of removal of the material from the substrate or the deepest etches into the substrate.

Figure 11B:
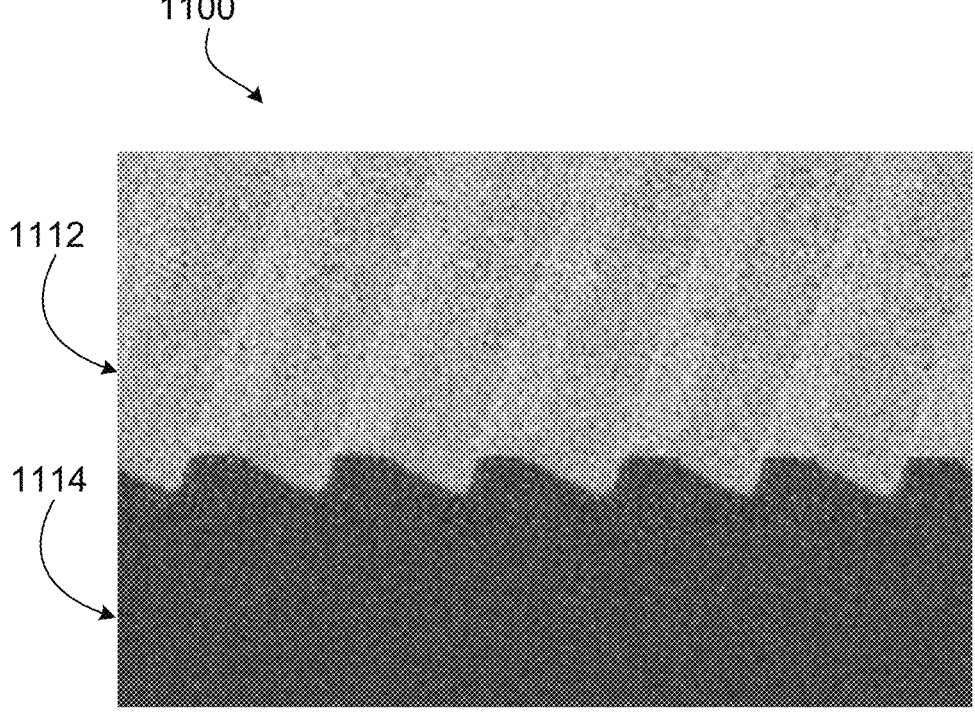
FIG. 11B is an SEM micrograph of an example grating structure formed in the manner depicted in FIG. 11A.

FIG. 11B is a scanning electron micrograph of a blazed diffraction grating 1112, wherein a blazed grating pattern is formed in a photoresist substrate 1104, for example by imprinting the photoresist with a patterned master. The diffraction grating 1112 shown has a single-step blazed geometry.

In some implementations, blazed gratings for ICGs have an acute anti-blaze angle. For example, referring to FIG. 12, a cross-sectional profile for one pitch length for such a grating is shown in which a grating structure 1200 includes a grating layer composed of ridge 1220 on a substrate 1210. A Cartesian coordinate system is provided for reference. The grating extends in the y-direction and the ridge 1220 extends from a base portion in the z-direction, with opposing slopes both angled with respect to the top surface of ridge 1220 and the substrate surface. Due to the slant of the ridge, for most of the anti-blaze side, there is a nonzero, horizontal distance between the anti-blaze side and the vertical line 1235, which intersects the apex 1237 of the ridge 1220, e.g., the apex 1237 and vertical line have the same value along the x axis. Horizontal distance means a distance along the x axis between two points having the same value along the z axis.

Two additional coatings 1230 and 1240 are formed on the surface of the grating layer. Coatings 1230 and 1240 are formed on a top surface of ridge 1220 and in the valleys between successive ridges, but only one slope of ridge 1220 (in this case, the left hand side) is coated, while the other slope remains substantially free of these layers. Coatings 1230 and 1240 can be formed using directional deposition methods (e.g., evaporation, glancing angle deposition). The asymmetric coating of the two ridge slopes can result from the directional deposition and the self-shadowing that occurs as a result. Encroachment of the coatings 1230 and 1240 under the overhang can occur, depending on the deposition method.

Figure 12:
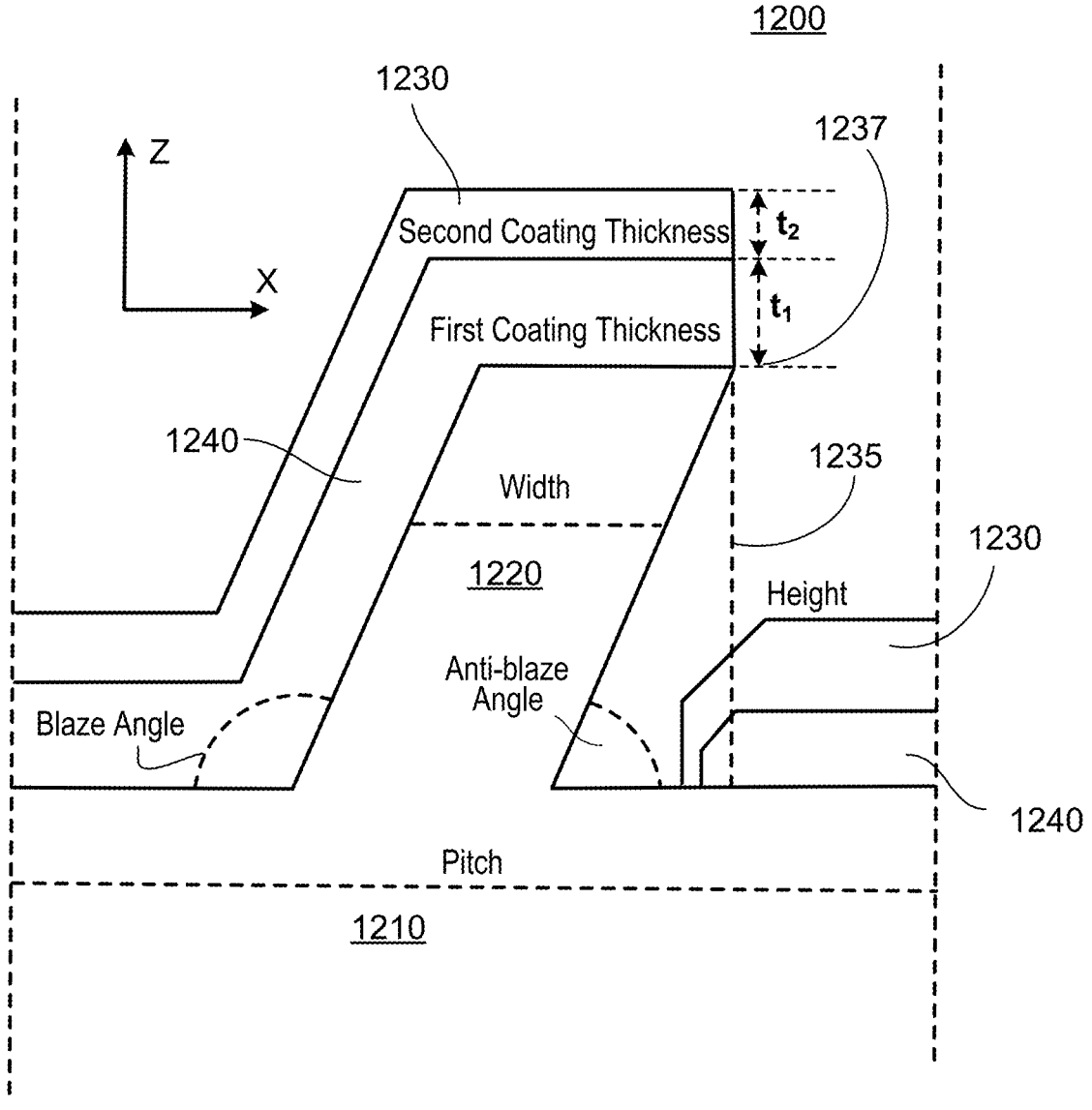
FIG. 12 is a cross-sectional schematic view showing a single pitch length of a grating structure composed of a slanted grating with first and second coatings thereon.

The grating design shown in FIG. 12 can be characterized by, among other things, six geometrical parameter and three materials. Depending on the illumination wavelength and the desired response these parameters can vary in the following ranges:

TABLE 1

| Parameter ranges for grating structure 1200. | |
| --- | --- |
| Parameter | Range |
| Anti-blaze Angle | 5°-85° |
| Height | 10 nm-1000 nm |
| Pitch | 100 nm-5,000 nm |
| Duty Cycle (Width/Pitch) | 5%-95% |
| First Coating Thickness | 5 nm-500 nm |
| Second Coating Thickness | 5 nm-500 nm |

As depicted in FIG. 12, the anti-blaze angle refers to an acute angle between the right-hand slope of ridge 1220 and the base surface. The anti-blaze angle can in a range from 5° to 85° (e.g., 10° to 80°, 30° to 80°, 40° to 75°, 50° to 70°, 60° to 70°).

The blaze angle refer to an obtuse angle between the left-hand slope of ridge 1220 and the base surface. For the geometry depicted in FIG. 12, a parallelogram, this angle is the compliment of the anti-blaze angle (i.e., 180° minus the blaze angle). This angle can be in a range from 95° to 160° (e.g., 100° or more, 110° or more, 120° or more, 150° or less, 140° or less). However, other geometries are possible. For example, the blaze profile can be a trapezoid, where both the blaze and anti-blaze side have a positive slope, but different absolute values. In other words, at least a portion of the anti-blaze side can have a tangent line with a same sign as a slope of the blazed side.

The height of the grating layer refers to the ridge dimension along the z-direction. The ridge 1220 can have a height in a range from 10 nm to 1,000 nm (e.g., 50 nm to 500 nm, 100 nm to 400 nm, 200 nm to 400 nm, 250 nm to 350 nm).

The pitch of the grating layer is the dimension along the x-direction between adjacent ridges or adjacent valleys. In general, the pitch, like the other parameters for grating structure 1200, can be determined empirically and/or through simulations. The pitch can be adjusted according to the operative wavelength(s) for the grating. In general, the pitch is in a range from 100 nm to 5,000 nm (e.g., 100 nm to 2,500 nm, 100 nm to 1,000 nm, 200 nm to 750 nm, 250 nm to 500 nm, 300 nm to 400 nm).

The ridges have a width, which refers to the dimension along x-direction. For grating structure 1200, the opposing slopes of ridge 1220 through the cross-section illustrated are parallel, so the ridge thickness is constant for the ridge through its height. However, it is possible in certain implementations for the width to vary (e.g., narrow) from the base of the ridge to the top. In implementations where the width varies, the width can be determined at the midpoint of the ridge's height.

The duty cycle refers to the ratio of the width to the pitch, expressed as a percentage. In implementations, the grating structure can have a duty cycle in a range from 5% to 95% (e.g., 10% to 75%, 20% to 50%, 30% to 40%).

The ridge has a height corresponding to the dimension of the ridge in the z-direction, measured from its base to its top surface. The ridges can have a height in a range from 10 nm to 1,000 nm (e.g., 50 nm to 500 nm, 100 nm to 400 nm, 200 nm to 400 nm, 250 nm to 350 nm).

The thickness of the layers, e.g., coatings 1230 and 1240, refer to the dimension of the layers in the z-direction measured at a point where the surface supporting the layer is perpendicular to the z-direction. The first coating 1230 and/or second layer can have a thickness in a range from 5 nm to 500 nm (e.g., 10 nm to 400 nm, 20 nm to 300 nm, 50 nm to 250 nm, 100 nm to 200 nm, 130 nm to 170 nm). Generally, the thickness of the first and second layer can be the same or different.

The base material of the grating structure (i.e., substrate 1210 and ridge 1220) can be a UV or Thermally crosslinked polymer. The refractive index of the base material can be in a range from 1.5 to 2.2 (e.g., 1.6 or more, 1.7 or more, 1.8 or more, 1.9 or more, 2.1 or more, such as up to 2.2). High refractive indexes (e.g., 1.8 or more) can be achieved using polymeric composite materials, e.g., that include nanoparticles (e.g., high index nanoparticles, e.g., $TiO_2$ nanoparticles and/or $ZrO_2$ nanoparticles).

Without wishing to be bound by theory, it is believed that higher index of the base patterned material can help make the diffraction efficiency relatively uniform over larger angles. For example, the variation of average TE and TM diffraction efficiency can be +/−15% or less (e.g., +/−10% or less, +/−8% or less, +/−5% or less) of the absolute average diffraction efficiency.

In some implementations, the first coating 1240 is composed of a material having a high refractive index (e.g., 1.8 or more). The first coating 1240 can be formed from a dielectric material including, but not limited to, titanium dioxide, gallium phosphide, and silicon carbide.

In certain implementations, the second coating 1230 is composed of a material having a low refractive index dielectric (e.g., 1.6 or less, 1.5 or less, 1.45 or less). The second coating can be formed, for example, from a dielectric material such as (but not limited to) silicon dioxide, magnesium fluoride, and calcium fluoride.

In general, the grating layer of grating structure 1200 and similar grating structures can be formed using the techniques described herein and in US20210033867A1 and US20210072437, the entire contents both of which are incorporated herein by reference.

First coating 1230 can be formed using a variety of physical vapor deposition techniques, including but not limited to sputtering and e-beam deposition. Second coating 1240 can be formed by a variety of physical vapor deposition techniques, including but not limited to sputtering and e-beam deposition. In general, the technique used to form coating 1230 can be the same or different as the technique used to form coating 1240.

Optical performance of an example grating structure as described in FIG. 12 above was simulated using rigorous coupled wave analysis (RWCA) as follows. Parameter values for the grating structure were:

TABLE 2

| Parameter and values for example ICG for operation at green wavelengths. | |
| --- | --- |
| Parameter | Value |
| Anti-Blaze Angle | 70° |
| Height | 260 nm |
| Pitch | 382 nm |
| Duty Cycle (Width/Pitch) | 40% |
| First Coating Thickness ($TiO_2$) | 120 nm |
| Second Coating Thickness ($MgF_2$) | 70 nm |

For purposes of the simulation, an operative wavelength of 525 nm was used and the base material had a refractive index of 2.0.

Figures 13A, 13B, 13C, 13D:
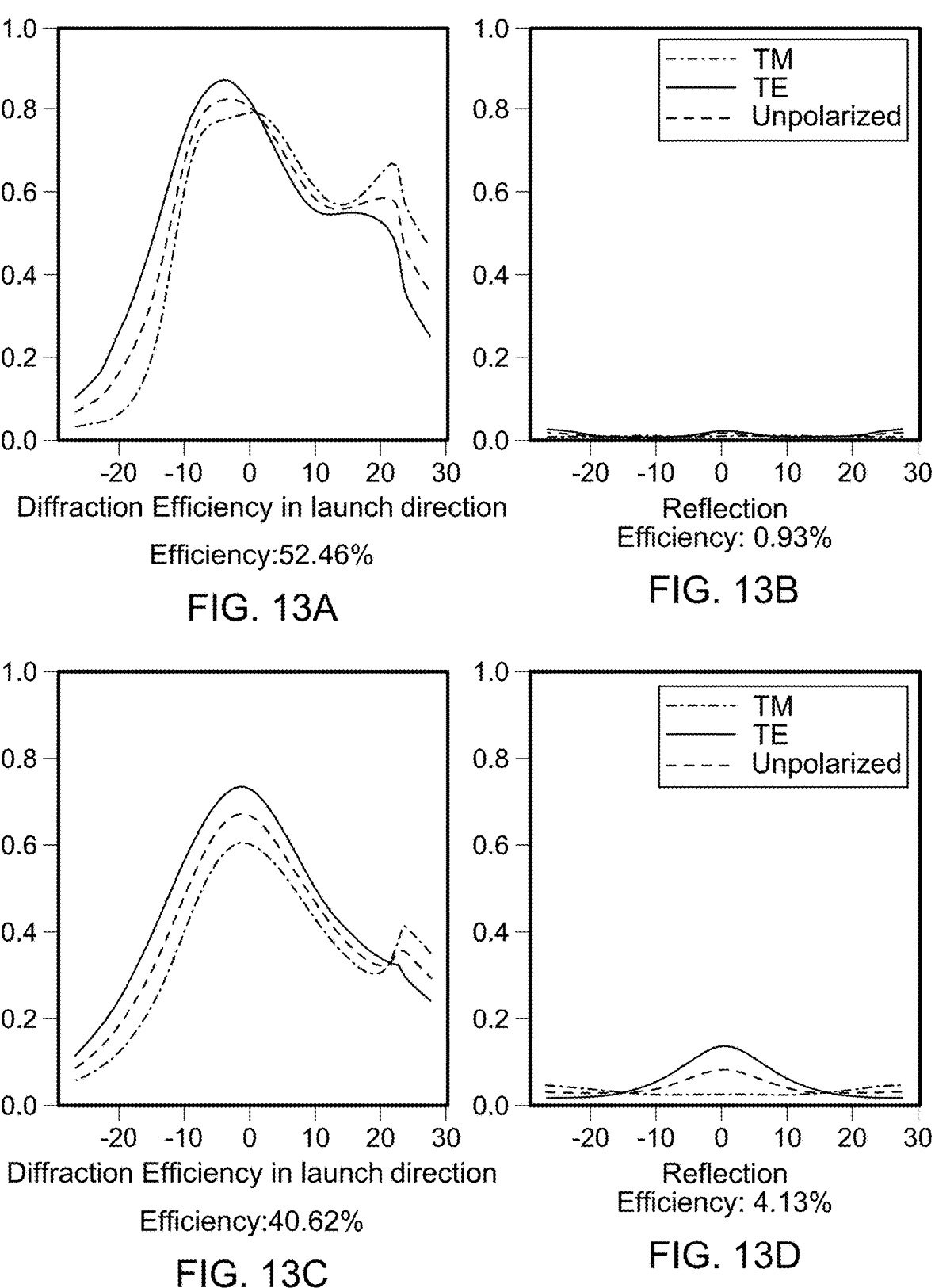
FIG. 13A-13D are plots comparing diffraction efficiency and reflection for an example grating structure composed of two coatings (FIGS. 13A-13B) and on coating (FIGS. 13C-13D), respectively.

FIGS. 13A-D include plots of the diffraction efficiency and reflection coefficient, e.g., what percentage of light impinging on a diffraction grating is diffracted or reflected, as a function of the launch angle. FIG. 13A shows diffraction efficiency in the launch direction as a function of illumination angle for the simulated grating over a field of view of 55°. The three curves correspond to TM polarized light, TE polarized light, and unpolarized light. An integral average of the diffraction efficiency of about 52% was calculated. Generally, it is believed that such gratings can provide an average diffraction efficiency of 50% or more for TE and TM polarized light over a +/−200 angle of incidence. FIG. 13B shows reflection efficiency as a function of illumination angle for the simulated grating for TM polarized light, TE polarized light, and unpolarized light. An integral average of the reflection efficiency of 0.93% was calculated. FIGS. 13C and 13D correspond to the same plots as shown in FIGS. 13A and 13B, respectively, simulated for the same structure except without the second layer. The diffraction efficiency is still high, e.g., an integral average of 40.62%, but back reflection increases significantly, e.g., has an integral average of 4.13%.

Figures 14A, 14B, 14C, 14D:
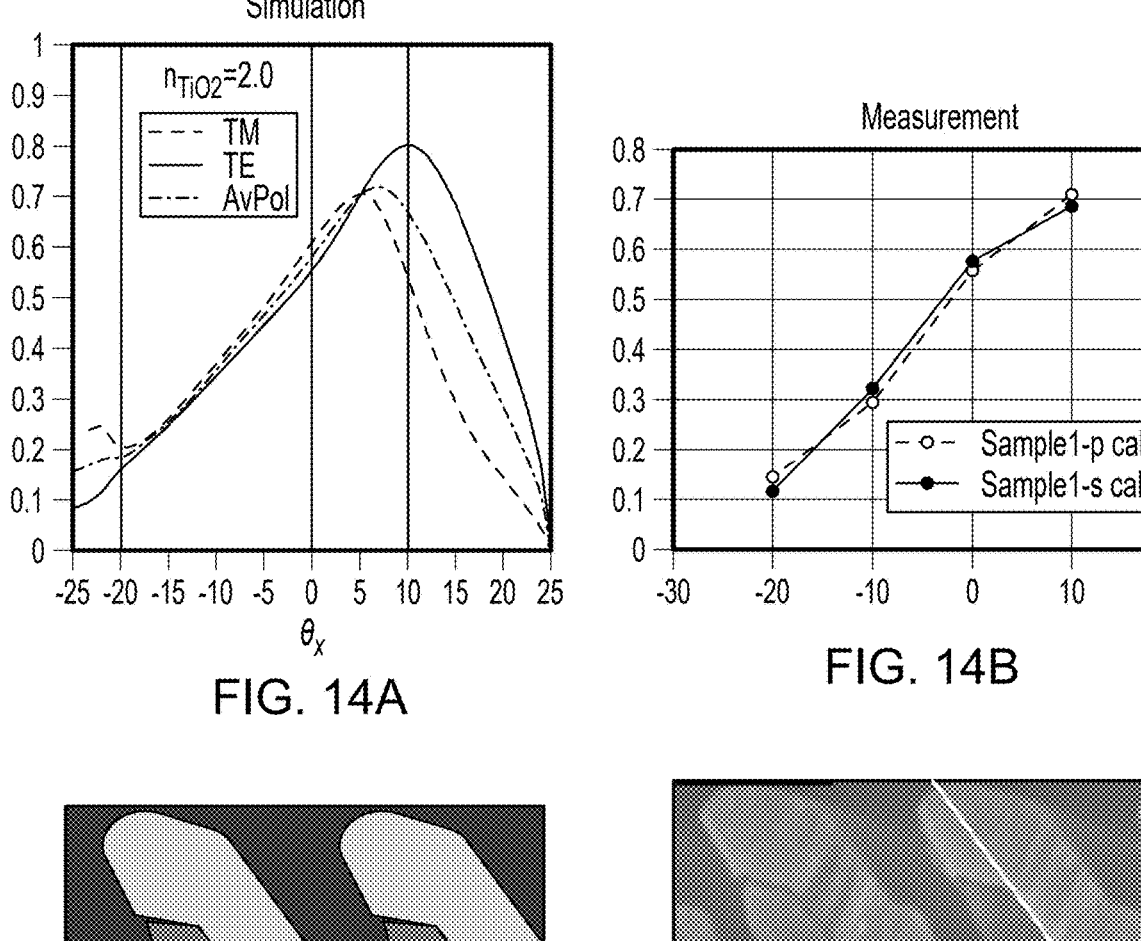
FIGS. 14A-14D compare the results of simulated diffraction efficiency (FIG. 14A) with measured diffraction efficiency (FIG. 14B) for grating structures depicted in FIGS. 14C and 14D, respectively.

Additional experiments were performed to compare the results of simulated grating structures to measurements of similar fabricated samples. Results of these experiments are shown in FIGS. 14A-14D. Specifically, FIGS. 14A and 14B show plots of diffraction efficiency as a function of incidence angle over a range of incidence angles for TM, TE, and unpolarized light. FIG. 14A shows simulated data, while FIG. 14B shows measurements of the fabricated sample of a subset of the simulated range for p-polarized (TM) and s-polarized (TE) light. FIGS. 14C and 14D show a schematic of the cross-section profile for this grating structure (FIG. 14C) and an SEM of the cross-section of the fabricated sample (FIG. 14D).

Figure 15A:
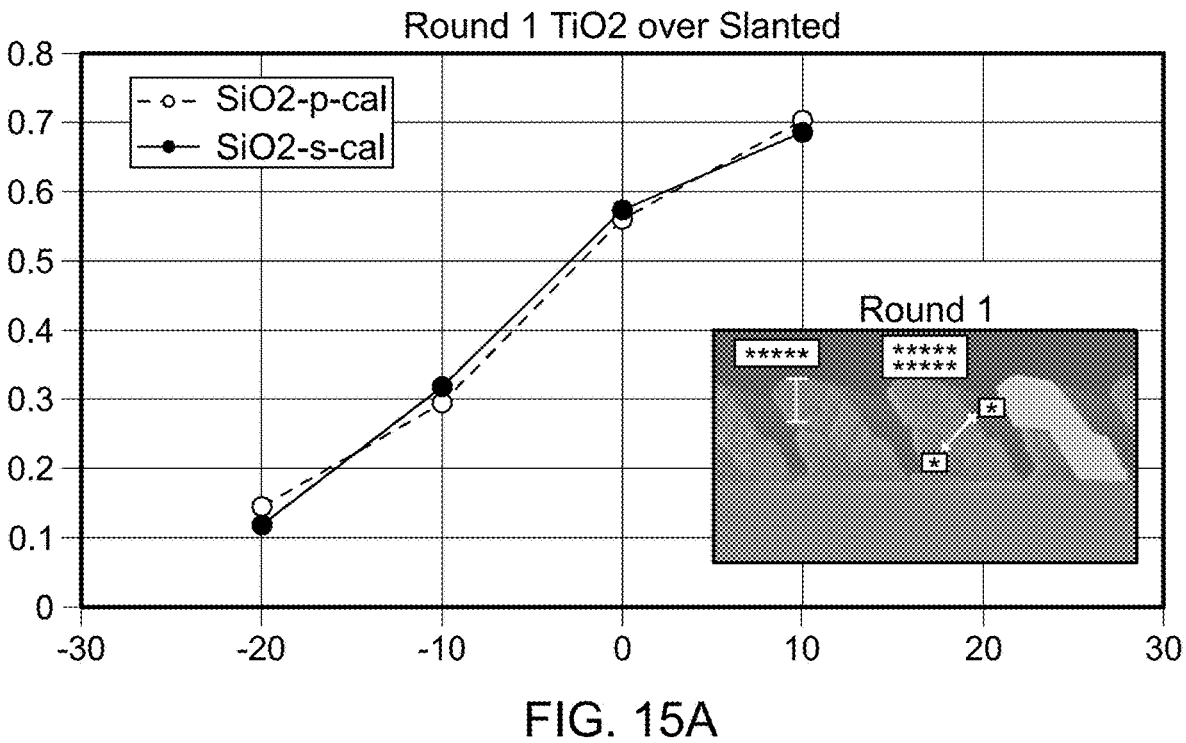
FIG. 15A is a plot of measured diffraction efficiency for an example grating structure with a single coating.
Figure 15B:
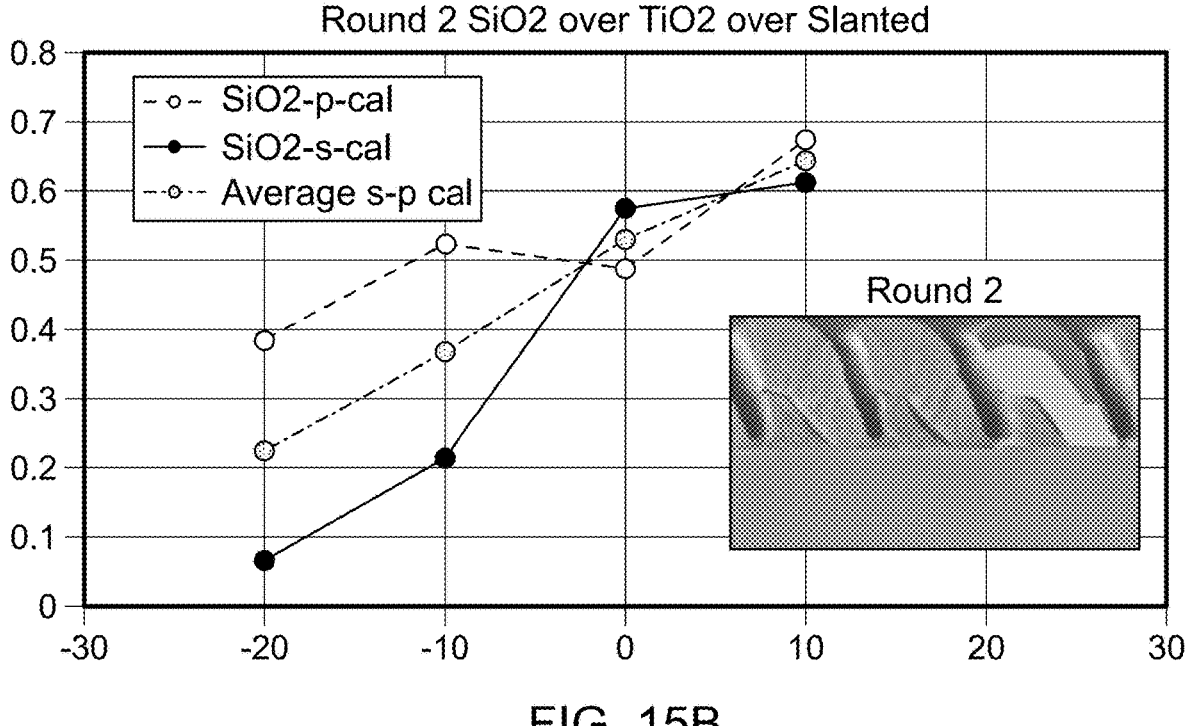
FIG. 15B is a plot of measured diffraction efficiency for the example grating structure shown in FIG. 15A with a second coating.
Figure 15C:
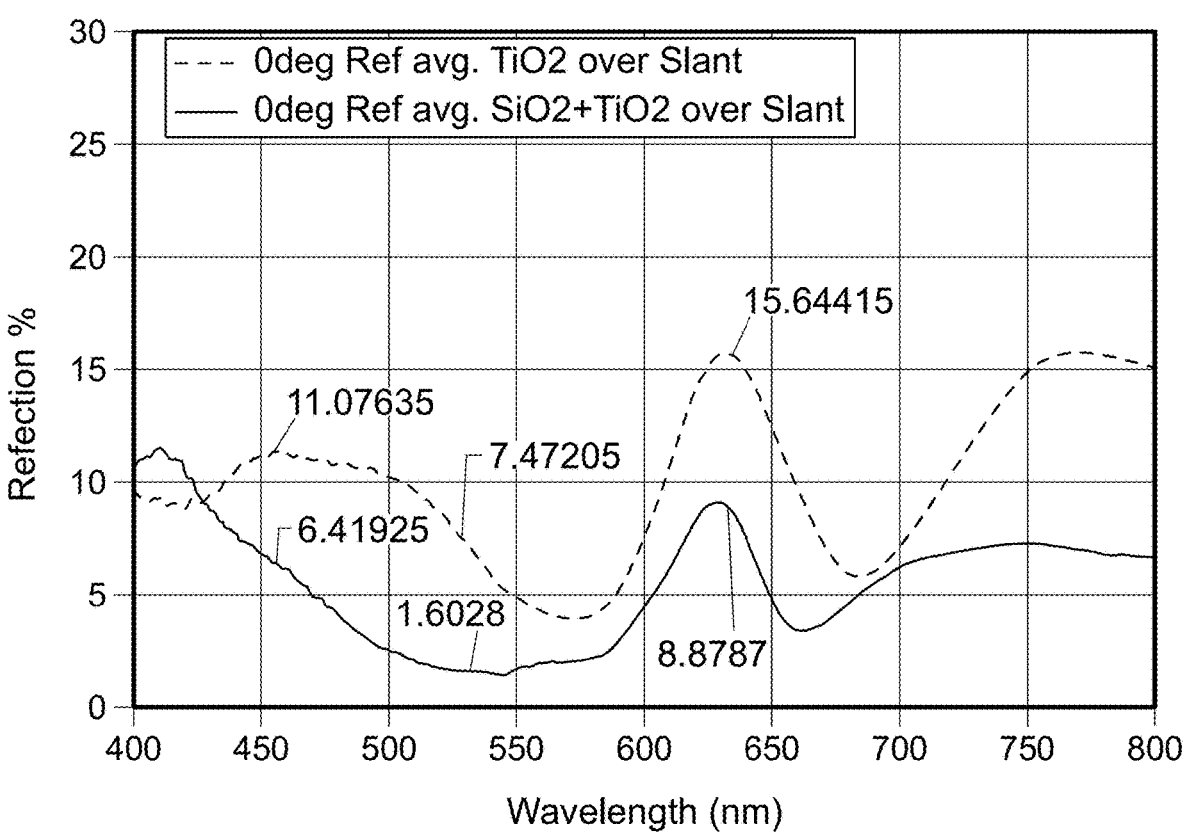
FIG. 15C is a plot of measured reflection % as a function of wavelength for the grating structures shown in FIGS. 15A and 15B, respectively.

FIGS. 15A-15C illustrate the effect of including a low index layer as the topmost layer in a grating structure. FIG. 15A is a plot of diffraction efficiency as a function of incident angle for orthogonal polarization states, e.g., s-polarized and p-polarized, for a $SiO_2$ grating structure that has a coating of $TiO_2$ thereon. An SEM of the cross-sectional profile of the grating structure is shown in the inset. FIG. 15B is a plot of diffraction efficiency as a function of incident angle for the same grating structure except a further layer of $SiO_2$ is formed over the $TiO_2$ layer. Average diffraction efficiency is shown along with the diffraction efficiency for both s- and p-pol. FIG. 15C shows a plot of reflection for normally incident light, e.g., 0° launch angle, as a function of wavelength for the visible light spectrum for the grating structure with and without the $SiO_2$ coating, e.g., the solid and dotted lines, respectively. Reflection is lower across almost the entire visible spectral range for the grating with an additional $SiO_2$ coating.

Figures 16A, 16B, 16C, 16D:
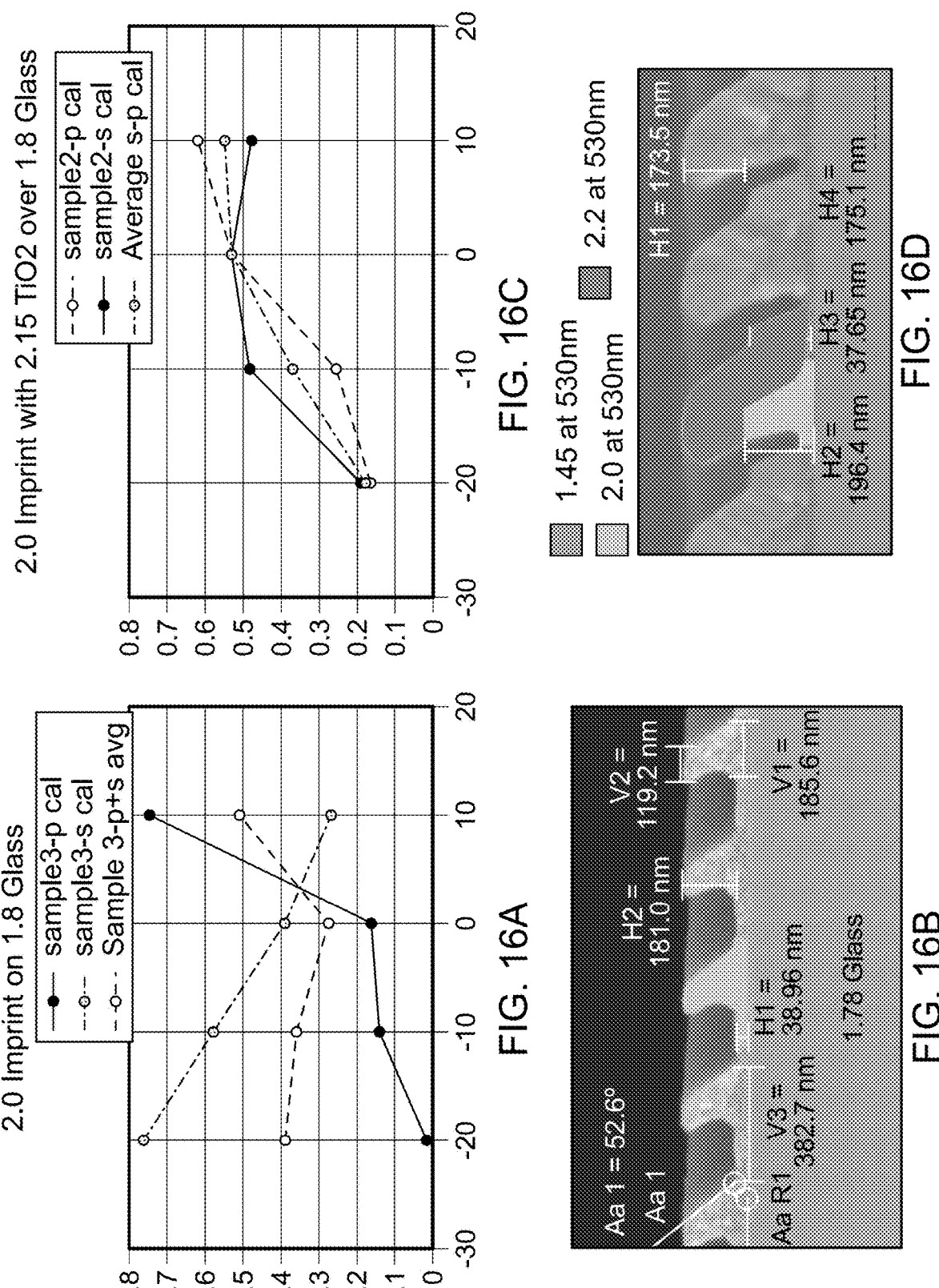
FIGS. 16A-16F are plots and SEM micrographs that compare diffraction efficiency as a function of angle for an example of a slanted grating with no coatings (FIGS. 16A and 16B), one coating (FIGS. 16C and 16D), and two coatings (FIGS. 16E and 16F), respectively.
Figures 16E, 16F:
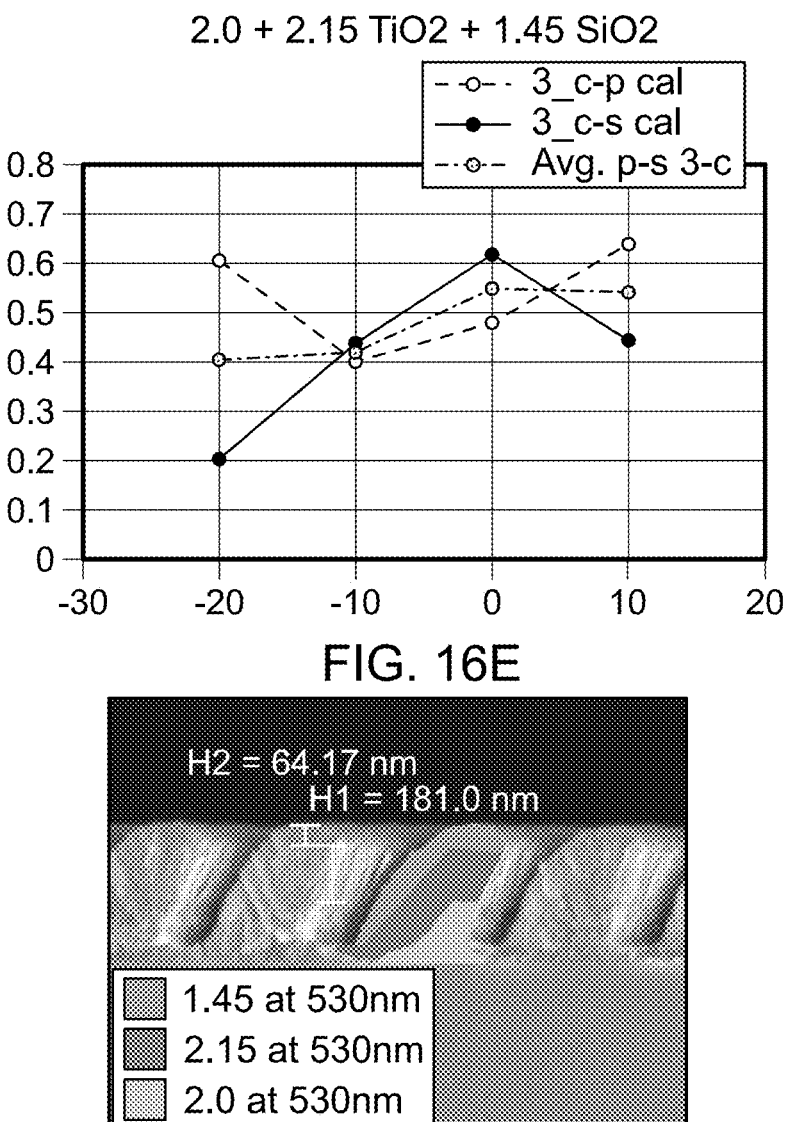

Measurements from further examples are shown in FIGS. 16A-16F. The three lines in FIGS. 16A, 16C, and 16E correspond to p-polarized light, s-polarized light, and an average of the other two lines. FIG. 16A is a plot of diffraction efficiency as a function of incident angle for the grating structure shown in the SEM in FIG. 16B composed of a high refractive index (n=2.0) composite on a glass substrate (n=1.78). The blaze angle, e.g., "Aa 1", is about 53°, the pitch, "V3" is about 383 nm, the height of the flat portion "H1" between ridges is about 39 nm, the height of a ridge "H2" relative to the flat portion is about 181 nm, the width of a top of a ridge is "V2" about 119 nm, and the width of a base of a ridge is about 186 nm. The height "H1" can have a thin resist layer thickness (RLT), e.g., less than 50 nm or less than 20 nm. FIG. 16C is a plot of diffraction efficiency as a function of incident angle for the grating structure shown in the SEM in FIG. 16D. The grating structure of FIG. 16D is composed of the high refractive index (n=2.0 for light at 530 nm) composite on the substrate (n=2.0 for light at 530 nm) in which the grating layer is coated with $TiO_2$ (n=2.2 for light at 530 nm). The ridge has a maximum height "H2" relative to the substrate of about 196 nm. The coating has a stepped shape, with a first level at a height "H3" relative to the substrate of 37.65 nm and a second level at a height "H1" about 173 nm above the maximum height of the ridge. FIG. 16E is a plot of diffraction efficiency as a function of incident angle for the grating structure shown in the SEM in FIG. 16F composed of the high refractive index (n=2.0 for light at 530 nm) composite on the glass, e.g., $SiO_2$, substrate (n=1.45 for light at 530 nm) with $TiO_2$ (n=2.15 for light at 530 nm) coating, where a further coating of $SiO_2$ (n=1.45 at 530 nm) coats the $TiO_2$ layer. The coatings have a stepped shape, the maximum width of the first $TiO_2$ coating "H1" is about 181 nm, and the maximum width of the second $SiO_2$ coating "H2" is about 64 nm. It is evident that the overall diffraction efficiency is increased compared to the single coating, particularly at higher incident angles.

While the foregoing example is of a grating structure with a ridge that is a parallelogram in shape, more generally, other cross-sectional shapes are possible. For example, trapezoidal, triangular, and stepped shapes are also possible. Moreover, while the shape is depicted corresponding to the shape of a parallelogram with mathematical precision, deviations from these shapes is inevitable due to manufacturing limitations, etc. In general, as used herein, such a ridge and other features are considered to have a particular shape where either their design prescribes such a shape and/or the structure has such a shape within the capabilities of the processes used to manufacture such structures at scale.

Figure 17A:
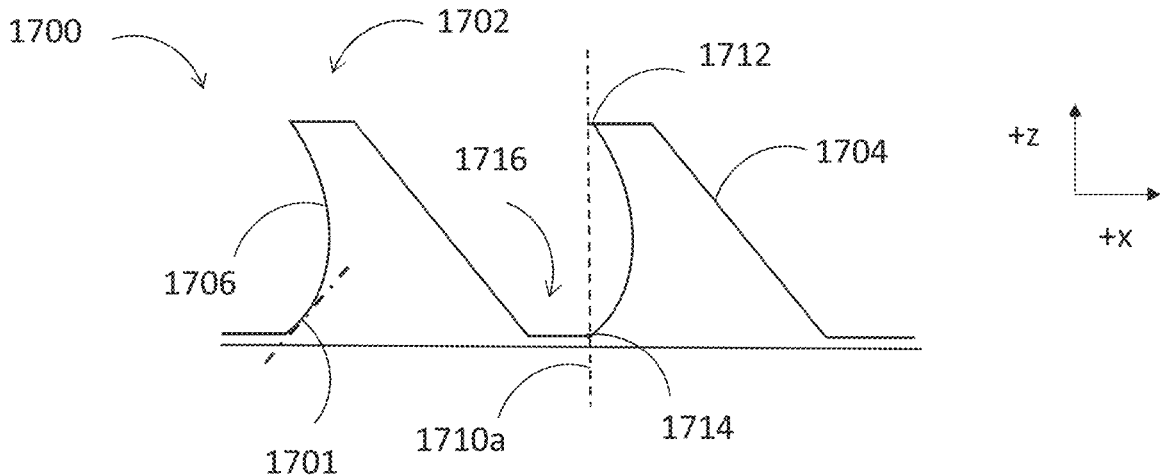
FIG. 17A shows a cross-sectional view of an example blazed grating with a concave anti-blaze side.

For example, the ridges of the grating structure can have a shape that facilitates formation of material deposition between the ridges without coating the anti-blaze side of the ridge. Coating the anti-blaze side with high index of refraction coatings and not coating flat portions of the grating between ridges can each reduce the diffraction efficiency. FIG. 17A shows a cross-sectional view of an example of a blazed grating 1700 with a concave anti-blaze side, where the concave surface can be curved or polygonal, e.g., non-linear. The blaze side 1704 of the ridge 1702 is linear, and the anti-blaze side 1706 of a ridge 702 is concave. Accordingly, only portions of the grating without a portion of the ridge obstructing the path along the vertical direction will be coated during deposition. In FIG. 17A, a vertical line 1710*a*, e.g., along the direction normal to the flat portions of the grating between ridges, connects the apex 1712, e.g., the uppermost apex of the anti-blaze side, and the base 1714 of the anti-blaze side 1706, e.g., the base 1714 is directly beneath the apex 1712. Along the anti-blaze side, there is a nonzero, horizontal distance between the anti-blaze side and the vertical line 1710*a* for most of the anti-blaze side In other words, portions of the anti-blaze side 1706 can overhang lower portions of the anti-blaze side. The curved concave anti-blaze side can be characterized by an angle formed by a tangent line 1701 near the base of the ridge. The tangent line 1701 can form an angle of 89° or less with flat portion of the grating.

Accordingly, as a result of the anti-blaze side 1706 curving outward near the bottom of the ridge, flat portions 1716 of the grating between ridges can be more completely covered during vertical deposition without coating the anti-blaze side 1706 of the ridge compared to if the anti-blaze side was just a slanted line. Increasing the coverage of the portions of the grating between ridges (coating in the trench) with high index of refraction coatings can increase the diffraction efficiency of the grating (e.g., by 20% or more, 30% or more, 50% or more, up to 60%). Due to the concave shape of the anti-blaze side 1706, uniform coverage of the flat portions of the grating between ridges can be achieved without significantly coating the anti-blaze side 1706, which can reduce the diffraction efficiency of the blazed grating 1700.

Figure 17B:
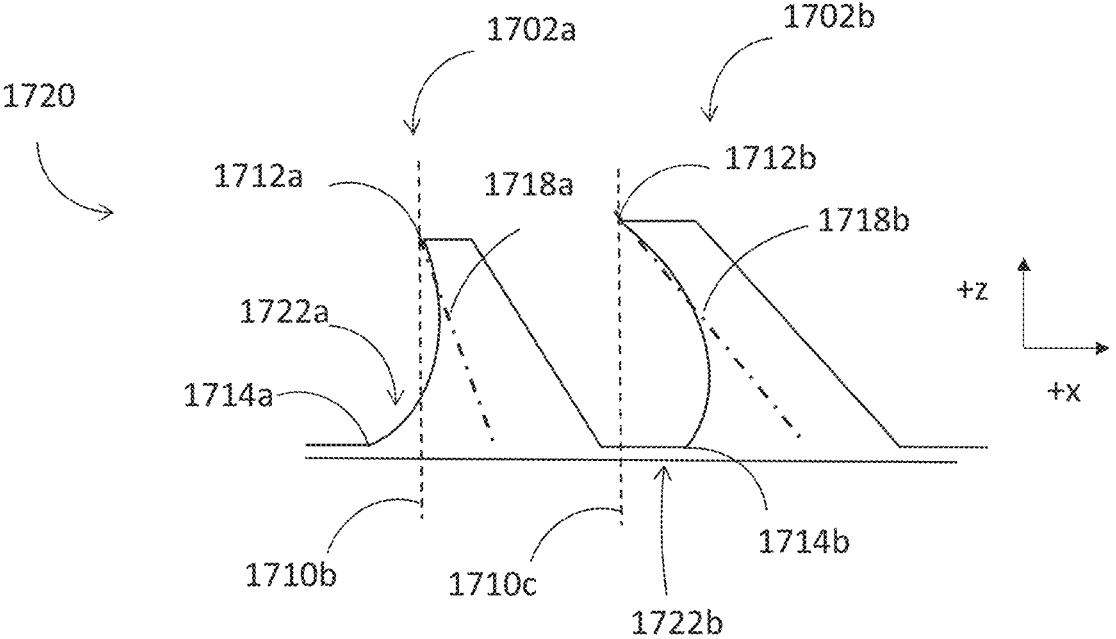
FIG. 17B shows a cross-sectional view of another example of a blazed grating with concave anti-blaze sides.

FIG. 17B shows a cross-sectional view of another example of a blazed grating 1720 with a concave anti-blaze side. In some implementations, the apex 712 and base 714 do not necessarily have the same value along the horizontal direction, e.g., x axis, while still achieving some of the benefits discussed above. For example, the first ridge 1702*a* has a concave anti-blaze side where the apex 1712*a* and base 1714*a* have different values along the horizontal direction, e.g., the apex 1712*a* is further to the right compared to the base 1714*a* (using vertical line 1710*b*, normal to the flat portions of the grating between ridges, as a reference). Consequently, during deposition a portion 1722*a* of the anti-blaze side will be coated. However, this portion 1722*a* is less than the portion that would get coated if the anti-blaze side was just a tangent line 1718*a* that followed the initial curvature of the anti-blaze side near the apex 1712*a*. Accordingly, the concave shape can reduce the amount of the anti-blaze side that will get coated even if the apex 1712*a* and base 1714*a* of the anti-blaze side are not perfectly aligned. In some cases the amount of undershadow (1722*a*) or overshadow (1722*b*) can be about 30% of the trench width.

As another example, the second ridge 1702*b* has a concave anti-blaze side where the apex 1712*b* and base 1714*b* have different values along the horizontal direction, e.g., the apex 1712*b* is further to the left compared to the base 1714*b* (using vertical line 1710*c* normal to the flat portions of the grating between ridges, as a reference). Consequently, a portion 1722*b* of the substrate will not get coated during deposition. However, this portion 1722*b* is less than the portion that would not get coated during deposition compared to if the anti-blaze side was just a tangent line 1718*b* that followed the initial curvature of the anti-blaze side near the apex 1712*b*. Accordingly, the concave shape can help increase the amount of the substrate that gets coated during deposition even if the apex 1712*a* and base 1714*a* of the anti-blaze side are not exactly aligned.

Note that tangent lines 1718*a* and 1718*b* each have a negative slope, similarly to the blaze sides. In other words, at least a portion of the anti-blaze side has a tangent line with the same sign as the slope of the blaze side.

In some implementations, the anti-blaze side has constant radius of curvature. In some implementations, the radius of curvature changes along the anti-blaze side. The radius of curvature can be 20 nm or more (e.g., 50 nm or more, 100 nm or more, 200 nm or more, 300 nm or more, up to 1,000 nm, such as 750 nm or less, 500 nm or less, 400 nm or less).

Figure 17C:
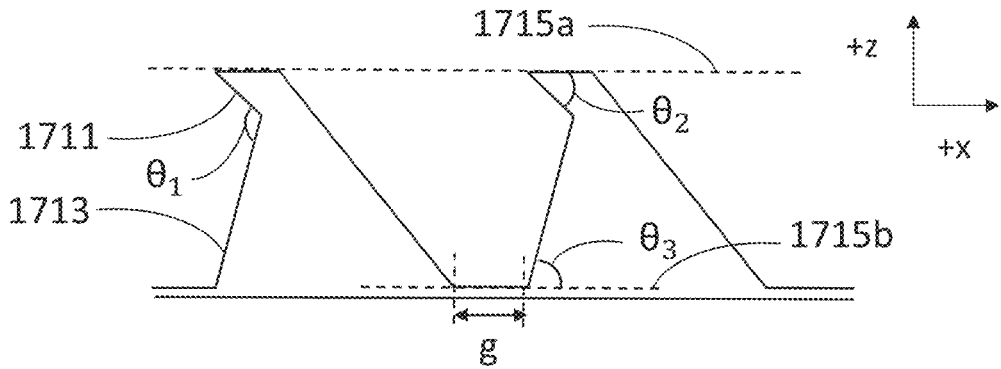
FIGS. 17C and 17D show cross-sectional views of example gratings with multifaceted anti-blaze sides.
Figure 17D:
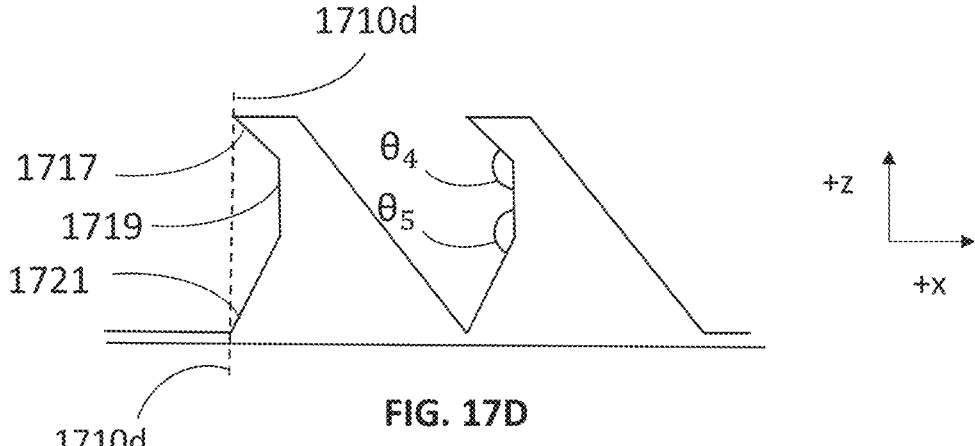

Although FIGS. 17A and 17B depict a concave shape of the anti-blaze side, other shapes can provide the benefits described above. For example, FIGS. 17C and 17D show cross-sectional views of other examples of gratings with multifaceted anti-blaze sides. The anti-blaze side in FIG. 17C has a profile of two lines 1711 and 1713 connecting at an angle, e.g., obtuse angle $\theta_1$. In other words, the anti-blaze side includes a series of line segments. Relative to a reference horizontal line 1715*a*, line 1711 can extend at a negative angle $\theta_2$, e.g., have a negative slope, and line 1713 can extend a positive angle relative to a reference horizontal line 1715*b*, e.g., have positive slope. The length of each line segment is generally equal to or less than the height of the grating divided by the sin of the blaze angle.

In some implementations, the anti-blaze side can have a profile of three or more lines, e.g., lines 1717, 1719, in 1721 connecting at different angles, e.g., 04 and 05, in FIG. 17D. Similarly to the examples where the ridges had a slanted or concave anti-blaze side, the multifaceted examples in FIGS. 17C and 17D also exhibit the following behavior: along the anti-blaze side, there is a nonzero, horizontal distance between the anti-blaze side and the vertical line 1710*d*, e.g., along the direction normal to the flat portions of the grating between ridges, for at least a portion of the anti-blaze side.

Although the example of obtuse angles are given in FIGS. 17C and 17D, other angles are possible where no portion of the anti-blaze side protrudes further than a vertical line 1710*d* determined by the apex, base, or both of the anti-blaze side, e.g., no portion of the anti-blaze side extends beyond the vertical line in the –x direction. FIGS. 17C and 17D both depict examples where the anti-blaze side has one facet with a slope with the same sign as the slope of the blaze side and another facet with a slope with the opposite sign as the slope as the blaze side. This geometric arrangement allows for at least some of the earlier described benefits regarding reducing how much of the anti-blaze side will be coated during deposition and coating the flat portions of the grating between ridges.

In some implementations, there is a gap between where one ridge begins and another ridge ends, e.g., the gap 'g' depicted in FIG. 17C between where the blaze side intersects the flat portion of the grating and where the neighboring anti-blaze side rises up from the flat portion of the grating. In some implementations, as depicted in FIG. 17D, there is no gap between where one ridge begins and another ridge ends. For example, the location at which neighboring blaze and anti-blaze sides intersect can be at the height (along the z axis) of the flat portion of the grating or higher.

Figure 17E:
FIG. 17E shows a cross-sectional view of an example blazed grating with concave anti-blaze sides and two layers deposited on the grating.
Figure 17E:
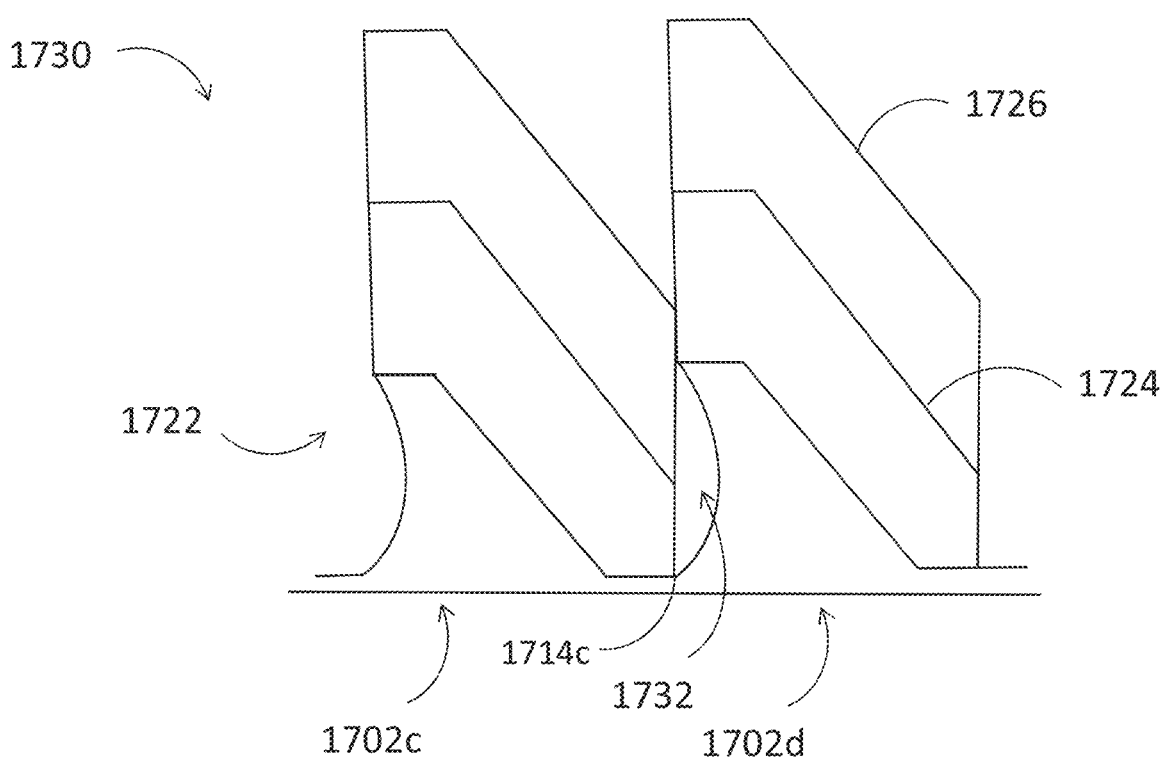

FIG. 17E shows a cross-sectional view of an example of a blazed grating 1730 with concave anti-blaze sides covered by two layers of coating. Each ridge 1722 is coated with a first layer 1724 and the second layer 1726. The descriptions of the two coatings in FIG. 16F can apply to the first and second layers 1724 and 1726. Due to the shape of the ridges, e.g., having a level top and slanted blaze side, and the width of the first and second layers 1724 and 1726, the first layer 1724 of the second ridge 1702*d* and second layer 1726 of the first ridge The edges of the first and second layers 1724 and 1726 on the first ridge 1702*c* and the anti-blaze side define an air gap 1732. The presence of the air gap 1732 means that at least a portion of the anti-blaze side is uncoated. The air gap 1732 extends along y direction. In some implementations, it is beneficial to reduce the volume of the air gap, since it generally has a lower index of refraction, e.g., n≈1, than the indices of refraction of the ridge and coatings. Reducing the size of an area within the coated grating with a lower index of refraction can improve the diffraction efficiency of the grating.

In some implementations, an air gap can form when there is only one coating on a diffraction grating if the surface of the coating is not parallel to the blaze side, e.g., has less negative slope. In some implementations, such as when the surface of coatings are roughly parallel to the ridges and each other, an air gap forms when there are at least two coatings.

The bottom of the second layer 1726 coating a first ridge 1702*c* borders the base 1714*c* of a second ridge 1702*d*, which means that none of the grating is exposed. However, other implementations are possible.

Figure 18:
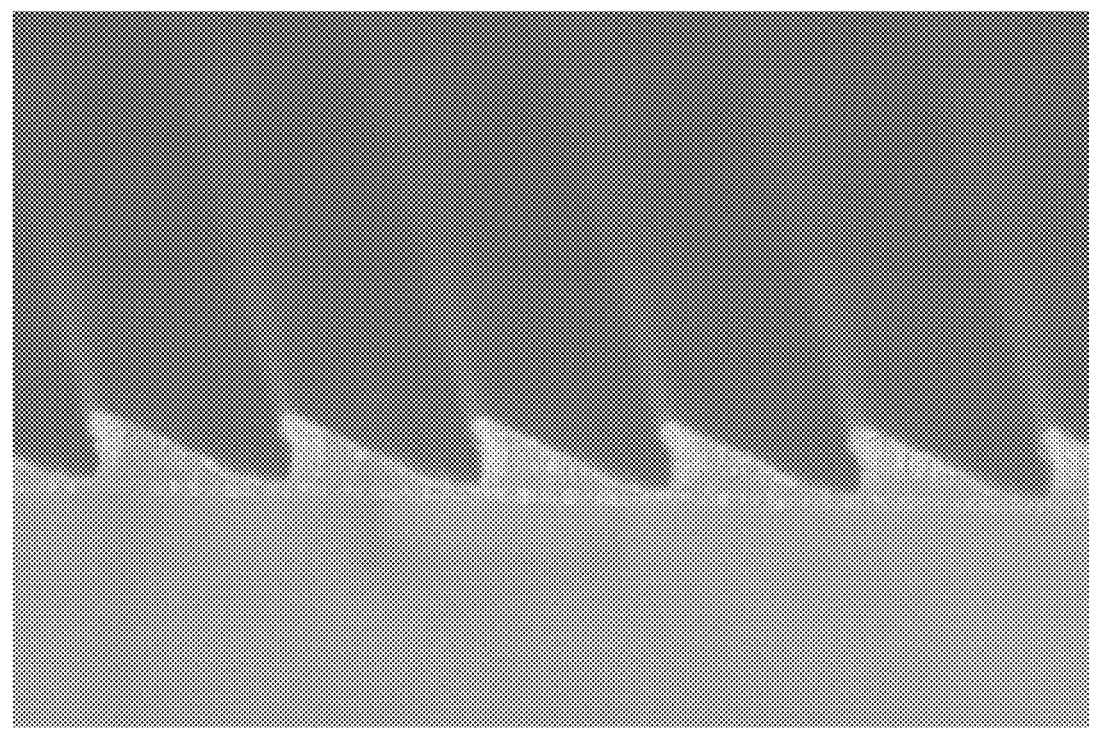
FIG. 18 is a scanning electron microscope (SEM) image of a reentrant blazed grating with variant slopes on the anti-blazed sidewall.

FIG. 18 is a scanning electron microscope (SEM) image of a reentrant blazed grating with variant slopes on the anti-blazed sidewall. A reentrant grating is generally located on the opposite side of the waveguide from a source of the light and couples light into the waveguide after the light passes through the waveguide. The reentrant blazed grating features and anti-blaze side with a curved portion, where the radius of curvature at the top is greater than the radius of curvature at the bottom. From the left side of the grating to the right side, the slope of the blaze side (right side of the ridge) gradually decreases. In practice, the geometries of blaze gratings can be determined using SEM analysis, which can include measuring between line segments indicating areas of high contrast.

In some implementations, such as when the blazed grating is used as an OPE, EPE, or CPE the blazed grating is located on a grating surface as shown in FIG. 9C (e.g., ICGs 700, 710, and 720, OPEs 730, 740, and 750, and EPEs 800, 810, and 820), for example.

Figures 19A, 19B, 19C, 19D, 19E, 19F, 19G, 19H, 19I:
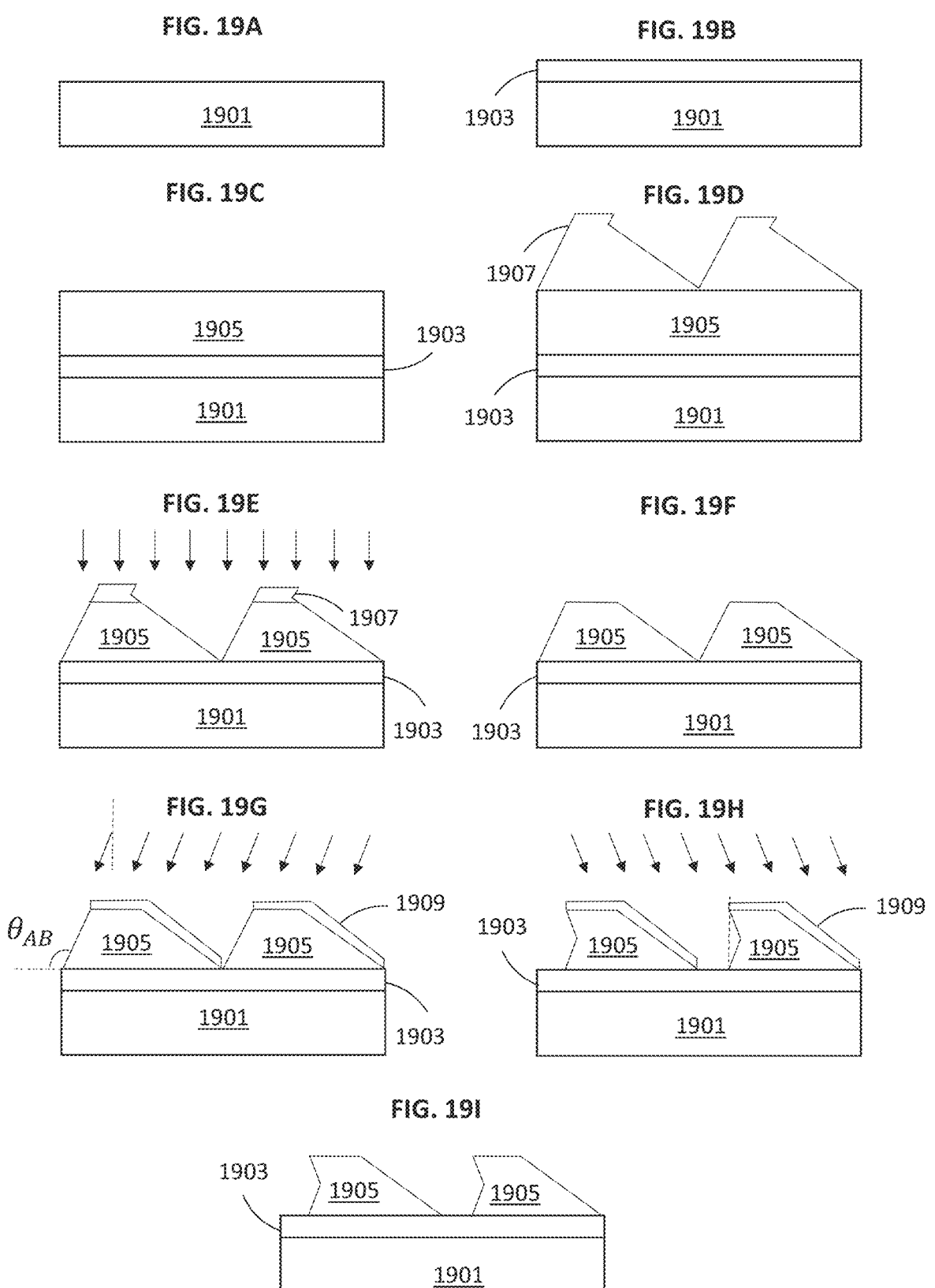
FIGS. 19A-19I are cross-sectional views of depicting a fabrication process for a reentrant grating with a multifaceted anti-blaze side.

FIGS. 19A-19I are cross-sectional views depicting a fabrication process for a reentrant grating with a multifaceted anti-blaze side. The process starts with a substrate 1901, e.g., silicon or silicon dioxide, depicted in FIG. 19A. Then, the substrate 1901 is coated with an etch stop layer 1903, as depicted in FIG. 19B. The etch stop layer 1903 can be, for example, chromium (Cr) or aluminum oxide ($Al_2O_3$) and can protect the substrate in later steps including dry etching. Next, in FIG. 19C, a layer which will become the grating, e.g., grating layer 1905, is imprinted on the etch stop layer 1903. The grating layer 1905 can be made from materials previously discussed in this disclosure, e.g., silicon dioxide.

FIG. 19D depicts a blazed grating template 1907, which can be wet etched silicon, on top of the grating layer 1905. In some implementation, the template has a flat top that is narrower than the flat top of the final blazed grating. The template having a narrow flat top can provide additional protection during the dry etching step, since the narrower top provides an additional portion at the top that can be removed by stripping instead of etching.

FIG. 19E depicts a dry etch step (indicated by downward arrows), which transfers the shape of the blazed grating from the template to the grating layer 1905. During dry etching, the top corners of the shape of the shape of the blazed grating erode more quickly than the rest of the shape. Some of the blazed grating template 1907 remains after dry etching. The remaining part of the blazed grating can be stripped, as depicted in FIG. 19F, after dry etching. Stripping the remaining portion of the blazed grating template 1907 instead of etching it can ensure feature fidelity, e.g., the shape of the grating layer 1905 will be similar to the shape of the blazed grating template 1907 except for the portion remaining after dry etching.

In FIG. 19G, an etch mask 1909 is directionally coated at an angle (indicated by the tilted arrows). Coating at an angle beneficially prevents coating the anti-blaze side, as the flat top and blazed side obstruct the path to the anti-blaze side. The angle of coating can be determined by the anti-blaze angle $\theta_{AB}$, e.g., the angle between the direction of coating and a vertical line can be equal to $90°-\theta_{AB}$ or less. Since $\theta_{AB}$ is greater than 90° the angle of coating can be negative, e.g., pointing to the left in FIG. 19G. Formulated differently, the absolute value of the angle between the direction of coating and a vertical line can be at least the difference between $90°-\theta_{AB}$.

FIG. 19H depicts dry etching the anti-blaze side with plasma from a Faraday cage, at an angle indicated by the tilted arrows. Due to a shielding effect, the Faraday cage can deflect the ions in the plasma to a direction perpendicular to the furnace of the Faraday cage. Consequently, use of a Faraday cage can deflect ions from the plasma in a direction to etch the anti-blaze side of the grating layer 1905. The etch mask 1909 protects the top and blaze side of the grating layer 1905 during etching. As a result of dry etching with a Faraday cage, an interior portion of the anti-blaze side, e.g., the area to the left of the dotted vertical line in FIG. 19H, can be removed.

FIG. 19I depicts the final grating structure after the etch mask 1909 has been stripped. Accordingly, the grating layer 1905 after dry etching has a different shape, e.g., a top layer removed and a multifaceted anti-blaze side, compared to the blazed grating template 1907 before etching.

In some implementations, dry etching with a Faraday cage is repeated multiple times at different angles to achieve the desired profile of the anti-blaze side. For example, FIGS. 19A-I show how dry etching with a Faraday cage at one angle produced an anti-blaze side with two facets. However, dry etching additional times at different angles can produce an anti-blaze side with three or more facets. Depending on the duration of the dry etching with a Faraday cage, a smooth, curved anti-blaze side can be achieved.

FIG. 20 is a flow diagram of a process 2000 for forming a blazed grating with a concave anti-blaze side, e.g., the cross section of the anti-blaze side is concave. Systems such as those described in US20210072437A1 (incorporated by reference above) can be used to perform at least some of the steps.

Process 2000 includes providing a substrate (2002), e.g., substrate 1901. The substrate can be a waveguide. In some implementations, the substrate 1004 can include, for example, materials such as those discussed in reference to substrate 1004, e.g., amorphous high index glass.

Process 2000 includes depositing an etch stop layer on the substrate (2004), e.g., etch stop layer 1903. The etch stop layer can be, for example, chromium (Cr) or aluminum oxide ($Al_2O_3$) and can protect the substrate in later steps including dry etching.

Process 2000 includes depositing a grating material, e.g., grating layer 1905, on the etch stop layer (2006). The grating material can be a patternable material, such as photoresist.

Process 2000 includes depositing a blazed grating template, e.g., blazed grating template 1907, on the grating material (2008). In some implementations, the blazed grating template is wet etched silicon.

In some implementations, the blazed grating template extends vertically beyond the final shape of the grating. For example, as in FIGS. 19D and 19E, the blazed grating template 1907 can have an upper portion that is narrower due to the base part of the template having a triangular shape. The shape of the narrower portion at the top is not intended to be transferred to the grating layer 1905, but provides a buffer for the top of the grating during etching.

Process 2000 includes etching the grating material, thereby transferring a shape of the blazed grating template to the grating material and forming a blazed grating (2010). The etching can include dry plasma etching, chemical etching, wet chemical etching, or a combination thereof.

In some implementations, step 2010 concludes before the entire blazed grating template has been etched, as in FIG. 19E. When there is a remaining portion of the blazed grating template, process 2000 can include stripping the remaining portion of the blazed grating template before proceeding to step 2012.

Process 2000 includes coating, at a first non-zero angle relative to a vertical direction, the blazed grating with an etch mask, e.g., etch mask 1909, such that an anti-blaze side of the grating remains uncoated (2012). For example, the non-zero angle can be the angle between the arrows and vertical lines in FIG. 19G.

Process 2000 includes etching, at a second non-zero angle relative to a vertical direction and with a sign opposite to a sign of the first non-zero angle, thereby removing an interior portion of the anti-blaze side (2014). In some implementations, etching includes dry etching the anti-blaze side with plasma from a Faraday cage. By removing an interior portion of the anti-blaze side, the anti-blaze sides becomes concave. In some implantations, the profile of the anti-blaze side is curved, includes linear segments, or both.

Process 2000 includes stripping the etch mask from the blazed grating (2016). As a result, the grating is a blazed grating with a concave anti-blaze side as depicted in FIG. 19I.

In some implementations, the process 2000 can include additional steps or some of the steps can be divided into multiple steps. For example, process 2000 can continue with coating the blazed grating with one or more additional layers of a high index of refraction material. Depending on the geometry, coating the blazed grating with one or more additional layers of a high index of refraction material leads to the formation of air gap between an edge of one of the additional layers and the anti-blaze side. In some implementations, using a non-zero angle relative to the vertical direction while coating the blazed grating with high index coatings is unnecessary in order to avoid coating the anti-blaze side. Additionally, without overhang of the anti-blaze side blocking the flat portions of the diffraction grating between ridges, vertical deposition can substantially cover the flat portions between the ridges of the grating.

Other variations of fabrication are also possible. For example, while the examples discussed above feature either one or two layers coating the grating layer, additional layers are possible. For example, additional layer can be included between the grating layer and the outermost low index layer.

While the foregoing example grating structures are one-dimensional gratings, other implementations are possible. For example, in some implementations, an array of structures can also be arranged in two directions to form a two dimensional (2D) array of diffractive features. The 2D array of diffractive features can include undulations in two directions. In some instances, the undulations can be periodic, while in other instances, the pitch of the undulations can vary in at least one direction. According to various examples described herein, the diffractive features have opposing sidewalls that are asymmetrically angled or tilted. According to various examples described herein, the diffractive features may be tapered.

In some implementations, the diffractive features can have opposing sidewalls that are substantially angled or tilted. In some implementations, the opposing sidewalls may be tilted in the same direction, while in other implementations, the opposing sidewalls may be tilted in opposite directions. In some other implementations, the diffractive features can have one of the opposing sidewalls that is substantially tilted, while having the other of the sidewalls that is substantially vertical or orthogonal to the horizontal axis or is at least tilted less than the other sidewall. In various examples of 2D diffractive features described herein, the 2D diffractive features can be formed in or on the underlying substrate, which can be a waveguide, as described above for various examples of 1D diffractive features. For example, the 2D diffractive features can be etched into the underlying substrate or be formed by patterning a separate layer formed thereon. Thus, the 2D diffractive features can be formed of the same or different material as the material of the substrate, in a similar manner as described above for various 2D diffractive features. Other variations and configurations are possible.

Accordingly, any of the structures or devices described herein such as grating structures may include a 1D grating. Similarly, any of the structures or devices described herein such as grating structures may include a 2D grating. Such 2D gratings may spread the light. These gratings may also include blazed gratings. Such blazed gratings may preferentially direct light in certain directions. In some implementations, the 2D gratings (e.g., having one tilted facet on the diffractive features) preferentially direct light in one direction while in others the 2D grating (e.g., having two tilted facets on the diffractive features differently) preferentially direct light into a plurality of directions Likewise, any of the methods or processes described herein can be used for 1D gratings. Similarly, any of the methods or processes described herein can be used for 2D gratings. These gratings, 1D or 2D, may be included in or on a substrate and/or waveguide and may be included in an eyepiece and possibly integrated into a head-mounted display as disclosed herein. These gratings may be employed as input gratings (e.g., ICGs), output gratings (EPEs), light distribution gratings (OPEs) or combined light distribution gratings/output gratings (e.g., CPEs). Examples of output coupling gratings are shown in FIGS. 9C and 10A, for example. Alternatively, or additionally, such gratings can be used in orthogonal pupil expanders (e.g., 730, 740, 750 in FIG. 9C). Such geometries can be optimized similarly for polarization insensitive output couplers and improve the display's transparency in the region in front of the user's eye, reducing back reflections which can be an issue for diffractive surface relief gratings when used as wearable waveguides.

Other implementations are in the following claims.

What is claimed is:
1. A head-mounted display system comprising:
a head-mountable frame;
a light projection system configured to output light to provide image content;
a waveguide supported by the head-mountable frame, the waveguide configured to guide at least a portion of the light from the light projection system coupled into the waveguide;
a grating structure optically coupled to the waveguide, the grating structure being configured to couple the light from the light projection system into the waveguide, the grating structure comprising:
a grating layer comprising a grating comprising a plurality of ridges having a blaze profile in at least one cross-section, the blaze profile comprising an anti-blaze angle of 89° or less; and
one or more additional layers disposed on the grating layer, the one or more additional layers comprising a first layer of a material having a refractive index of 1.5 or less at an operative wavelength of the head-mounted display system, the first layer being an outermost layer of the grating structure,
wherein the grating layer is disposed between the waveguide and the one or more additional layers, and the first layer is discontinuous between adjacent ridges of the plurality of ridges.
2. The head-mounted display system of claim 1, wherein the blaze profile has a blaze angle of 95° or more.

3. The head-mounted display system of claim 1, wherein the ridges have a profile shape selected from the group consisting of: trapezoidal, parallelogram, triangular, and stepped.

4. The head-mounted display system of claim 1, wherein the anti-blaze angle is in a range from 1° to 89°.

5. The head-mounted display system of claim 1, wherein the ridges have a height in a range from 10 nm to 1,000 nm.

6. The head-mounted display system of claim 1, wherein the grating has a pitch in a range from 100 nm to 5,000 nm.

7. The head-mounted display system of claim 1, wherein the grating has a duty cycle in a range from 5% to 95%.

8. The head-mounted display system of claim 1, wherein the first layer has a thickness in a range from 5 nm to 500 nm.

9. The head-mounted display system of claim 1, wherein the one or more additional layers comprise a second layer between the first layer and the grating layer, the second layer comprises a second material having a refractive index greater than 1.5 at the operative wavelength, and the grating layer comprises a grating material having a refractive index of 1.5 or more at the operative wavelength.

10. The head-mounted display system of claim 9, wherein the grating material comprises a cross-linked polymer.

11. The head-mounted display system of claim 10, wherein the grating material comprises nanoparticles.

12. The head-mounted display system of claim 1, wherein the grating structure is at least partially transmissive at the operative wavelength.

13. The head-mounted display system of claim 1, wherein, during operation, the grating structure is configured to couple light into the waveguide at operative wavelengths corresponding to multiple differently colored pixels of the light projection system.

14. The head-mounted display system of claim 1, wherein the grating layer and the waveguide are composed of the same material.

15. The head-mounted display system of claim 14, wherein the material comprises a polymer.

16. The head-mounted display system of claim 14, wherein the material has a refractive index of 1.7 or more.

17. The head-mounted display system of claim 1, wherein the light from the light projection system is unpolarized light or polarized light.

18. The head-mounted display system of claim 1, wherein the light projection system comprises a microLED display, an LCOS display, or a laser beam scanner display.

19. The head-mounted display system of claim 1, wherein the grating structure is a first grating structure, and further comprising a second grating structure located on an opposite side of the waveguide from the first grating structure, the second grating structure being optically coupled to the waveguide and comprising a second grating layer comprising a second grating comprising a plurality of ridges having a blaze profile in at least one cross-section, the blaze profile comprising an anti-blaze angle of 89° or less.

20. The head-mounted display system of claim 1, further comprising one or more additional waveguides and one or more additional grating structures each associated with a corresponding one of the additional waveguides.

21. The head-mounted display system of claim 20, wherein the one or more additional grating structures of each of the one or more additional waveguides is arranged in an inline configuration, wherein at least one of the one or more additional grating structures is a reflection grating, and wherein the reflection grating is the grating structure of the waveguide furthest from the light projection system.

22. The head-mounted display system of claim 1, wherein at least some of the ridges have a single-step geometry.

23. The head-mounted display system of claim 1, wherein at least some of the ridges have a multi-step geometry.

\*　\*　\*　\*　\*